US012759901B2

(12) United States Patent
Huang et al.

(10) Patent No.: US 12,759,901 B2
(45) Date of Patent: Oct. 13, 2026

(54) PASSIVE FREEZING DESALINATION DRIVEN BY RADIATIVE COOLING

(71) Applicant: The Regents of the University of California, Oakland, CA (US)

(72) Inventors: Xin Huang, Union City, CA (US); Aaswath Pattabhi Raman, Los Angeles, CA (US); Jyotirmoy Mandal, Princeton, NJ (US)

(73) Assignee: The Regents of the University of California, Oakland, CA (US)

( * ) Notice: Subject to any disclaimer, the term of this patent is extended or adjusted under 35 U.S.C. 154(b) by 191 days.

(21) Appl. No.: 18/847,640

(22) PCT Filed: Apr. 27, 2023

(86) PCT No.: PCT/US2023/066292
§ 371 (c)(1),
(2) Date: Sep. 16, 2024

(87) PCT Pub. No.: WO2023/212640
PCT Pub. Date: Nov. 2, 2023

(65) Prior Publication Data

US 2025/0042774 A1 Feb. 6, 2025

Related U.S. Application Data

(60) Provisional application No. 63/363,700, filed on Apr. 27, 2022.

(51) Int. Cl.

| | |
|---|---|
| ***C02F 1/22*** | (2023.01) |
| ***C02F 1/14*** | (2023.01) |
| *C02F 103/08* | (2006.01) |

(52) U.S. Cl.
CPC .................. *C02F 1/22* (2013.01); *C02F 1/14* (2013.01); *C02F 2103/08* (2013.01); *C02F 2201/009* (2013.01)

(58) Field of Classification Search
CPC .......... C02F 1/14; C02F 1/22; C02F 2103/08; C02F 2201/009; C02F 2301/08; Y02A 20/124
See application file for complete search history.

(56) References Cited

U.S. PATENT DOCUMENTS

| | | | |
|---|---|---|---|
| 4,291,673 | A | 9/1981 | Deutz |
| 5,816,057 | A | 10/1998 | Dickey et al. |

(Continued)

FOREIGN PATENT DOCUMENTS

| | | | |
|---|---|---|---|
| CN | 113562801 A | 10/2021 | |
| JP | 2001348694 A | 12/2001 | |

(Continued)

OTHER PUBLICATIONS

International Search Report and Written Opinion received for International Application No. PCT/US2023/066292, Search completed Oct. 23, 2023, Mailed Nov. 14, 2023, 10 pgs.

(Continued)

*Primary Examiner* — Filip Zec
(74) *Attorney, Agent, or Firm* — KPPB LLP

(57) ABSTRACT

Radiative cooling enabled passive freezing desalination processes are described. High salinity water can be desalinated via radiative cooling-driven freezing desalination. The passive freezing desalination processes can be a complementary method to solar desalination to enable 24-hour, year round passive thermal desalination.

20 Claims, 14 Drawing Sheets

(56) References Cited

U.S. PATENT DOCUMENTS

| | | | | |
|---|---|---|---|---|
| 8,206,557 | B2 * | 6/2012 | Burke | B01D 5/0051 202/205 |
| 9,988,284 | B2 * | 6/2018 | Reda | C02F 1/06 |
| 10,329,167 | B2 * | 6/2019 | Calene | B01D 5/0075 |
| 10,532,936 | B2 * | 1/2020 | Al-Azazmeh | B01D 5/006 |
| 10,981,805 | B2 * | 4/2021 | Armstrong | B01D 1/22 |
| 10,987,609 | B1 * | 4/2021 | Walker | B01D 1/0035 |
| 11,318,396 | B1 * | 5/2022 | Quadrini, Jr. | F24S 10/60 |
| 2008/0141694 | A1 | 6/2008 | Sharma et al. | |
| 2010/0104938 | A1 | 4/2010 | Hermann | |
| 2015/0246826 | A1 | 9/2015 | Frolov et al. | |
| 2016/0369646 | A1 * | 12/2016 | Hendrix | B01D 5/0057 |
| 2021/0380437 | A1 * | 12/2021 | Rosti | B01D 1/0082 |

FOREIGN PATENT DOCUMENTS

| | | | |
|---|---|---|---|
| WO | 2023212640 | A2 | 11/2023 |
| WO | 2023212640 | A3 | 1/2024 |

OTHER PUBLICATIONS

International Preliminary Report on Patentability received for International Application No. PCT/US2023/066292, Report issued Oct. 29, 2024, Mailed Nov. 7, 2024, 9 pgs.

Al-Hajouri et al., "Long term experience in the operation of nanofiltration pretreatment unit for seawater desalination at SWCC SWRO plant", Desalination and Water Treatment, vol. 51, No. 7-9, Feb. 2013, pp. 1861-1873, doi: 10.1080/19443994.2012.718135.

Badawy, "Laboratory freezing desalination of seawater", Desalination and Water Treatment, vol. 57, No. 24, May 2016, pp. 11040-11047, doi: 10.1080/19443994.2015.1041163.

Bae et al., "Flexible thin-film black gold membranes with ultrabroadband plasmonic nanofocusing for efficient solar vapour generation", Nature Communications, vol. 6, Article 10103, Dec. 14, 2015, 9 pgs., doi: 10.1038/ncomms10103.

Beier et al., "Laboratory investigation on freeze separation of saline mine waste water", Cold Regions Science and Technology, vol. 48, No. 3, Jun. 2007, pp. 239-247, doi: 10.1016/j.coldregions.2006.12.002.

Borsani et al., "Fundamentals and costing of MSF desalination plants and comparison with other technologies", Desalination, vol. 182, No. 1-3, Nov. 1, 2005, pp. 29-37, doi: 10.1016/j.desal.2005.03.007.

Brantley et al., "Engaging over data on fracking and water quality Data alone aren't the solution, but they bring people together", Science, vol. 359, No. 6374, Jan. 26, 2018, pp. 395-397, doi: 10.1126/science.aan6520.

Chang et al., "Freeze desalination of seawater using LNG cold energy", Water Research, vol. 102, Oct. 1, 2016, pp. 282-293, doi: 10.1016/j.watres.2016.06.046.

Chen et al., "Radiative cooling to deep sub-freezing temperatures through a 24-h day-night cycle", Nature Communications, vol. 7, Article 13729, Dec. 13, 2016, 5 pgs., doi: 10.1038/ncomms13729.

Cole et al., "Observations of brine drainage networks and microstructure of first-year sea ice", Journal of Geophysical Research, vol. 103, No. C10, Sep. 15, 1998, pp. 21739-21750, doi: 10.1029/98JC01264.

Darwish et al., "Energy Consumptions and Costs of Different Desalting Systems", Desalination, vol. 64, 1987, pp. 83-96, doi: 10.1016/0011-9164(87)90087-7.

Elimelech et al., "The Future of Seawater Desalination: Energy, Technology, and the Environment", Science, vol. 333, No. 6043, Aug. 5, 2011, pp. 712-717, doi: 10.1126/science.1200488.

Fournier et al., "Water Desalination by Natural Freezing", Desalination, vol. 15, No. 2, Oct. 1974, pp. 167-175, doi: 10.1016/S0011-9164(00)82080-9.

Fujioka et al., "Application of progressive freeze-concentration for desalination", Desalination, vol. 319, Jun. 14, 2013, pp. 33-37, doi: 10.1016/j.desal.2013.04.005.

Ghaffour et al., "Renewable energy-driven desalination technologies: A comprehensive review on challenges and potential applications of integrated systems", Desalination, vol. 356, Jan. 15, 2015, pp. 94-114, doi: 10.1016/j.desal.2014.10.024.

Ghaffour et al., "Technical review and evaluation of the economics of water desalination: Current and future challenges for better water supply sustainability", Desalination, vol. 309, Jan. 15, 2013, pp. 197-207, doi: 10.1016/j.desal.2012.10.015.

Greenlee et al., "Reverse osmosis desalination: Water sources, technology, and today's challenges", Water Research, vol. 43, No. 9, May 2009, pp. 2317-2348, doi: 10.1016/j.watres.2009.03.010.

Heist, "Freeze crystallization", Chemical Engineering, vol. 86, No. 10, May 7, 1979, pp. 72-82.

Hossain et al., "Radiative Cooling: Principles, Progress, and Potentials", Advanced Science, vol. 3, No. 7, Article 1500360, 2016, 10 pgs., doi: 10.1002/advs.201500360.

Jones et al., "The state of desalination and brine production: A global outlook", Science of The Total Environment, vol. 657, Mar. 20, 2019, pp. 1343-1356, doi: 10.1016/j.scitotenv.2018.12.076.

Kashyap et al., "Flexible Anti-Clogging Graphite Film for Scalable Solar Desalination by Heat Localization", Journal of Materials Chemistry A, vol. 5, No. 29, 2017, pp. 15227-15234, doi: 10.1039/C7TA03977H.

Khawaji et al., "Advances in seawater desalination technologies", Desalination, vol. 221, No. 1-3, Mar. 1, 2008, pp. 47-69, doi: 10.1016/j.desal.2007.01.067.

Kim et al., "Purification of High Salinity Brine by Multi-Stage Ion Concentration Polarization Desalination", Scientific Reports, vol. 6, No. 31850, Aug. 22, 2016, 11 pgs., doi: 10.1038/srep31850.

Lattemann et al., "Environmental impact and impact assessment of seawater desalination", Desalination, vol. 220, No. 1-3, Mar. 1, 2008, pp. 1-15, doi: 10.1016/j.desal.2007.03.009.

Li et al., "3D-Printed, All-in-One Evaporator for High-Efficiency Solar Steam Generation under 1 Sun Illumination", Advanced Materials, vol. 29, No. 26, Article 1700981, Jul. 12, 2017, 8 pgs., doi: 10.1002/adma.201700981.

Melak et al., "Freeze Desalination as Point of Use Water Treatment Technology: A Case of Chromium (VI) Removal from Water", Proceedings, vol. 2, No. 5, Article 173, 2018, 10 pgs., doi: 10.3390/ecws-2-04942.

Ni et al., "Steam generation under one sun enabled by a floating structure with thermal concentration", Nature Energy, vol. 1, No. 9, Article 16126, Sep. 2016, 7 pgs., doi: 10.1038/nenergy.2016.126.

Palomar et al., "Impacts of Brine Discharge on the Marine Environment. Modelling as a Predictive Too", Desalination, Trends and Technologies, Chapter 13, Feb. 2011, pp. 279-310.

Raman et al., "Passive radiative cooling below ambient air temperature under direct sunlight", Nature, vol. 515, No. 7528, Nov. 27, 2014, pp. 540-544, doi: 10.1038/nature13883.

Rich et al., "Sea water desalination by dynamic layer melt crystallization: Parametric study of the freezing and sweating steps", Journal of Crystal Growth, vol. 342, No. 1, Mar. 2012, pp. 110-116, doi: 10.1016/j.jcrysgro.2011.03.061.

Schiermeier, "Water: Purification with a pinch of salt", Nature, vol. 452, Mar. 20, 2008, pp. 260-261, doi: 10.1038/452260a.

Shannon et al., "Science and technology for water purification in the coming decades", Nature, vol. 452, Mar. 20, 2008, pp. 301-310, doi: 10.1038/nature0659.

Sommariva et al., "Cost reduction and design lifetime increase in thermal desalination plants: thermodynamic and corrosion resistance combined analysis for heat exchange tubes material selection", Desalination, vol. 158, No. 1-3, Aug. 1, 2003, pp. 17-21, doi: 10.1016/S0011-9164(03)00427-2.

Tao et al., "Solar-driven interfacial evaporation", Nature Energy, vol. 3, Dec. 2018, pp. 1031-1041, doi: 10.1038/s41560-018-0260-7.

Tong et al., "The Global Rise of Zero Liquid Discharge for Wastewater Management: Drivers, Technologies, and Future Directions", Environmental Science & Technology, vol. 50, No. 13, Jun. 8, 2016, pp. 6846-6855, doi: 10.1021/acs.est.6b01000.

Vengosh et al., "A Critical Review of the Risks to Water Resources from Unconventional Shale Gas Development and Hydraulic Frac-

(56) References Cited

OTHER PUBLICATIONS turing in the United States", Environmental Science & Technology, vol. 48, No. 15, Mar. 7, 2014, pp. 8334-8348, doi: 10.1021/es405118y.

Vidic et al., "Impact of Shale Gas Development on Regional Water Quality", Science, vol. 340, No. 6134, May 17, 2013, pp. 1235009-1-1235009-9, doi: 10.1126/science.1235009.

Wang, "Emerging investigator series: the rise of nano-enabled photothermal materials for water evaporation and clean water production by sunlight", Environmental Science: Nano, vol. 5, 2018, pp. 1078-1089, doi: 10.1039/c8en00156a.

Wang et al., "Pathways and challenges for efficient solar-thermal desalination", Science Advances, vol. 5, No. 7, Jul. 26, 2019, 12 pgs., doi: 10.1126/sciadv.aax0763.

Wenten et al., "Reverse osmosis applications: Prospect and challenges", Desalination, vol. 391, Aug. 1, 2016, pp. 112-125, doi: 10.1016/j.desal.2015.12.011.

Williams et al., "Technology for freeze concentration in the desalination industry", Desalination, vol. 356, Jan. 15, 2015, pp. 314-327, doi: 10.1016/j.desal.2014.10.023.

Xie et al., "A direct contact type ice generator for seawater freezing desalination using LNG cold energy", Desalination, vol. 435, Jun. 1, 2018, pp. 293-300, doi: 10.1016/j.desal.2017.04.002.

Yang et al., "Application of freeze concentration for fluoride removal from water solution", Journal of Water Process Engineering, vol. 19, Oct. 2017, pp. 260-266, doi: 10.1016/j.jwpe.2017.05.009.

Ye et al., "Synthesis of Black TiOx Nanoparticles by Mg Reduction of TiO2 Nanocrystals and their Application for Solar Water Evaporation", Advanced Energy Materials, vol. 7, No. 4, Article 1601811, 2016, 7 pgs., doi: 10.1002/aenm.201601811.

Yi et al., "Scalable and Low-cost Synthesis of Black Amorphous Al—Ti—O Nanostructure for High-Efficient Photothermal Desalination", Nano Energy, vol. 41, Nov. 2017, pp. 600-608, doi: 10.1016/j.nanoen.2017.09.042.

Zhang et al., "Effect of Surface Energy on Freezing Temperature of Water", ACS Applied Materials & Interfaces, vol. 8, No. 27, Jun. 17, 2016, pp. 17583-17590, doi: 10.1021/acsami.6b02094.

Zhang et al., "Plasmonic heating from indium nanoparticles on a floating microporous membrane for enhanced solar seawater desalination", Nanoscale, vol. 9, No. 35, 2017, pp. 12843-12849, doi: 10.1039/c7nr05149b.

Zhao et al., "Highly efficient solar vapour generation via hierarchically nanostructured gels", Nature Nanotechnology, vol. 13, No. 6, Jun. 2018, pp. 489-495, doi: 10.1038/s41565-018-0097-z.

Zhao et al., "Radiative sky cooling: Fundamental principles, materials, and applications", Applied Physics Reviews, vol. 6, No. 2, Article 021306, Jun. 2019, pp. 021306-1-021306-40, doi: 10.1063/1.5087281.

Zhou et al., "3D self-assembly of aluminium nanoparticles for plasmon-enhanced solar desalination", Nature Photonics, vol. 10, Jun. 2016, pp. 393-398, doi: 10.1038/nphoton.2016.75.

Zhou et al., "Self-assembly of highly efficient, broadband plasmonic absorbers for solar steam generation", Science Advance, vol. 2, No. 4, Article e1501227, Apr. 8, 2016, 8 pgs., doi: 10.1126/sciadv.1501227.

Zielinski et al., "Hollow Mesoporous Plasmonic Nanoshells for Enhanced Solar Vapor Generation", Nano Letters, vol. 16, No. 4, Feb. 26, 2016, pp. 2159-2167, doi: 10.1021/acs.nanolett.5b03901.

* cited by examiner

A

B

PASSIVE FREEZING DESALINATION DRIVEN BY RADIATIVE COOLING

CROSS-REFERENCE TO RELATED APPLICATIONS

The current application is a national stage of PCT Application No. PCT/US2023/066292 entitled "Passive Freezing Desalination Driven by Radiative Cooling" filed Apr. 27, 2023, which claims the benefit of and priority to U.S. Provisional Patent Application No. 63/363,700 entitled "Passive Freezing Desalination Driven by Radiative Cooling" filed Apr. 27, 2022, the disclosures of which are incorporated herein by reference in their entirety.

FIELD OF THE INVENTION

The present invention generally relates to systems and apparatuses of passive freezing desalination; and more particularly to systems and apparatuses of passive freezing desalination driven by radiative cooling.

BACKGROUND OF THE INVENTION

Fresh water scarcity is expected to grow with rising temperatures, a challenge that will be compounded by growth in demand for water worldwide. Only 1.5% of water on Earth is freshwater, with 96.5% in the ocean as salt water. Desalination is a process that removes salts and mineral components from saline water. Salt water, such as seawater, can be desalinated to produce fresh water. Desalination has thus become an important method for the production of fresh water. Conventional membrane-based desalination processes may require significant energy inputs, which can become prohibitive as salinity increases. Alternatively, solar desalination can be a passive evaporative approach but limited seasonally and geographically by solar insolation. Low carbon intensity methods for desalination that are not limited by solar insolation may be needed.

Passive radiative cooling (PRC) is a passive process where objects under the sky spontaneously reflect sunlight and radiate heat into outer space through the long wavelength infrared (LWIR, 8-13 μm wavelength) transparency window of the atmosphere. PRC has a net cooling effect that can be a sustainable way to cool buildings and outdoor structures.

BRIEF SUMMARY OF THE INVENTION

Many embodiments are directed to systems and methods for passive freezing desalination processes. Several embodiments utilize passive radiative cooling processes to freeze and desalinate salt water. The outer space can be used as a heat sink to absorb the radiated heat and enable passive freezing desalination through radiative cooling. The passive freezing desalination processes can recover at least 50% of fresh water from salt water. Many embodiments provide that passive freezing desalination process can be a complementary method to solar desalination to enable 24 hour, year round passive thermal desalination.

One embodiment of the invention includes a method for desalination comprising: contacting a water source with a radiative cooling surface, wherein the radiative cooling surface faces outwardly to an atmosphere; wherein the radiative cooling surface comprises a thermal emitter with an emissivity from 0.5 to 1 at an electromagnetic wavelength range from 8 μm to 13 μm; freezing the water source via radiative cooling to form ice and brine; wherein the radiative cooling transfers heat from the water source to the atmosphere via the radiative cooling surface; and obtaining desalinated water by thawing the ice, wherein the desalinated water has a salinity lower than the water source.

An additional embodiment further comprises washing the ice with a low salinity water.

Another embodiment further comprises sweating the ice under a temperature gradient.

In a further embodiment, the water source is selected from the group consisting of: brackish water, saline water, seawater, salt water, and any combinations thereof.

In an additional embodiment, the water source has a salinity greater than or equal to 35%.

Another further embodiment further comprises adding at least one ice seed to the water source before freezing.

A further yet embodiment comprises separating the ice from the brine.

In a further embodiment again, the separating uses a filter.

In an additional embodiment again, a hydrophilic surface of a collection container for the ice and brine improves ice collection efficiency.

Another further embodiment comprises using the desalinated water as the water source in the desalination method described in claim 1.

In a further yet embodiment, the thawing is via passive solar heating.

In another embodiment again, the thermal emitter comprises a material selected from the group consisting of: an acrylic polymer, indium tin oxide, aluminum oxide, hafnium oxide, and any combinations thereof.

In an additional further embodiment, the radiative cooling surface is insulated with at least one material to minimize a thermal emittance.

In yet another embodiment, the at least one material is selected from the group consisting of: polyurethane, polyurethane foam, polystyrene, cellulose, mylar, low density polyethylene, high density polyethylene, polyester, polyisocyanurate, fiberglass, wool, reflective foil, natural fiber, and any combinations thereof.

In a yet further embodiment again, the at least one material comprises a double-layer low density polyethylene.

In an additional embodiment, the desalinated water has a salinity of less than 35%.

In a further yet embodiment, the desalination is combined with a solar desalination process.

Another embodiment includes a desalination system comprising: a water source; a radiative cooling surface in contact with the water source; wherein the radiative cooling surface faces outwardly to an atmosphere, and is configured to transfer heat from the water source to the atmosphere and to freeze the water source; wherein the radiative cooling surface comprises a thermal emitter with an emissivity from 0.5 to 1 at an electromagnetic wavelength range from 8 μm to 13 μm; and a collecting system configured to collect ice from the frozen water source, wherein the ice comprises desalinated water.

In a further embodiment, the water source is selected from the group consisting of: brackish water, saline water, seawater, salt water, and any combinations thereof.

In an additional embodiment, the water source has a salinity greater than or equal to 35%.

In a further yet embodiment, the water source comprises at least one ice seed.

Yet another embodiment further comprises a separation system to separate ice and brine from the frozen water source.

In a yet further embodiment, the separation system comprises a filter.

In a further embodiment again, the collecting system comprises a hydrophilic surface to improve ice collection efficiency.

In a further yet embodiment, the thermal emitter comprises a material selected from the group consisting of: an acrylic polymer, indium tin oxide, aluminum oxide, hafnium oxide, and any combinations thereof.

In another embodiment again, the radiative cooling surface is insulated with at least one material to minimize a thermal emittance.

In yet another embodiment, the at least one material is selected from the group consisting of: polyurethane, polyurethane foam, polystyrene, cellulose, mylar, low density polyethylene, high density polyethylene, polyester, polyisocyanurate, fiberglass, wool, reflective foil, natural fiber, and any combinations thereof.

In a further embodiment, the at least one material comprises a double-layer low density polyethylene.

In an additional embodiment, the desalinated water has a salinity of less than 35%.

In a further yet embodiment, the desalinated water is used as the water source for the desalination system.

Another yet further embodiment includes a hybrid desalination system comprising: a desalination system comprising: a water source; a radiative cooling surface in contact with the water source; wherein the radiative cooling surface faces outwardly to an atmosphere, and is configured to transfer heat from the water source to the atmosphere and to freeze the water source; wherein the radiative cooling surface comprises a selective thermal emitter with an emissivity from 0.5 to 1 at an electromagnetic wavelength range from 8 μm to 13 μm, and an emissivity from 0.5 to 1 at an electromagnetic wavelength range from 0.3 μm to 2.5 μm; and a collecting system configured to collect ice from the frozen water source, wherein the ice comprises desalinated water; and a solar thermal desalination system; wherein the solar thermal desalination system desalinates during daytime and the desalination system desalinates during nighttime.

In an additional embodiment, the water source is selected from the group consisting of: brackish water, saline water, seawater, salt water, and any combinations thereof.

In another embodiment again, the water source has a salinity greater than or equal to 35%.

In yet another embodiment, the water source comprises at least one ice seed.

A further yet embodiment comprises a separation system to separate ice and brine from the frozen water source.

In another embodiment again, the separation system comprises a filter.

In an additional embodiment, the collecting system comprises a hydrophilic surface to improve ice collection efficiency.

In a further yet embodiment, the selective thermal emitter comprises a material selected from the group consisting of: an acrylic polymer, indium tin oxide, aluminum oxide, hafnium oxide, and any combinations thereof.

In another further embodiment, the radiative cooling surface is insulated with at least one material to minimize a thermal emittance.

In yet another embodiment again, the at least one material is selected from the group consisting of: polyurethane, polyurethane foam, polystyrene, cellulose, mylar, low density polyethylene, high density polyethylene, polyester, polyisocyanurate, fiberglass, wool, reflective foil, natural fiber, and any combinations thereof.

In a further yet embodiment, the at least one material comprises a double-layer low density polyethylene.

In yet another embodiment, the desalinated water has a salinity of less than 35%.

In an additional embodiment again, the desalinated water is used as the water source for the desalination system.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Figure 1A:
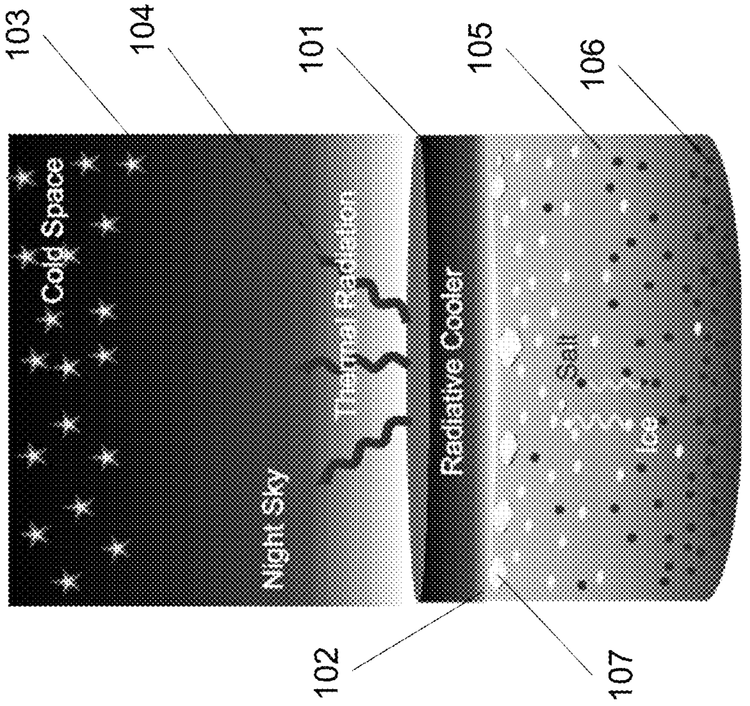
FIG. 1A illustrates a radiative cooling freezing desalination process in accordance with an embodiment of the invention.

Turning now to the drawings and data, passive freezing desalination processes are described. The passive freezing desalination processes can be passively driven by radiative cooling. Radiative cooling is a passive process and can reduce energy input for the desalination processes. The passive freezing desalination processes in accordance with many embodiments include the steps (but are not limited to) freezing a water source, separating frozen ice particles, washing ice particles, and melting ice particles to retrieve fresh water. The water source can have a salinity greater than about 35% (or about 3.5% (or about 35 g/L). Examples of the water source include (but are not limited to): brackish water, saline water, seawater, salt water, brine, and any combinations thereof. The desalinated water has a salinity less than or equal to about 35% (or about 3.5%; or about 35 g/L). In some embodiments, the water source can be desalinated to near-potable water salinity levels. When the water source is frozen, or crystallized to ice, salt can separate from the ice crystals. The ice crystals can be collected as a source for desalinated water.

A number of embodiments provide improved washing methods by having a hydrophilic surface on the bottom. When freezing happens, the smaller ice particles of lower density accumulated on the bottom may float to the top, and can be washed by the flowing down water from the top. Several embodiments implement counter-flowing of water and ice to wash out the salt on the ice particles.

Several embodiments provide that the surface properties can be modified to improve the ice collection efficiency. In many embodiments, hydrophilic surfaces can improve the ice nucleation efficiency as water is more likely to form ice on a hydrophilic surface rather than the hydrophobic surface. In some embodiments, the hydrophilic coating can provide the nucleation site, which avoids the supercooling problem.

Conventional evaporative desalination may encounter corrosion problems due to high temperature operation. The passive freezing desalination processes can overcome such challenges as heating is not required. Freezing desalination can also lower energy input. The passive freezing desalination processes can complement existing thermal evaporative desalination methods, including solar desalination to realize year-round, 24 hour a day passive thermal desalination. In some embodiments, the low-salinity water generated by passive freezing desalination processes can serve as a water source for membrane-based desalination to overcome the high pressures encountered when desalinating high-salinity input streams.

Desalination

Freshwater scarcity is expected to grow with rising temperatures, a challenge that will be compounded by growth in demand for water worldwide. Only 1.5% of water on Earth is freshwater, with 96.5% of it in the ocean as saltwater. Desalination has thus become an important method for the production of fresh water. In addition to fresh water generation, managing industrial waste streams including saline waste from oil and gas facilities as well as brine waste from seawater desalination plants, can be essential to mitigate the threats posed to human health and environmental conditions. Conventional membrane-based desalination processes are widely deployed, but require significant energy inputs. (See, e.g. T. Tong, et al., *Environ. Sci. Technol,* 2016, 50, 6846-6855; I. G. Wenten, et al., *Desalination,* 2016, 391, 112-125; L. F. Greenlee, *Water Res.,* 2009, 43, 2317-2348; the disclosures of which are incorporated herein by references.) These energy inputs can increase dramatically with the high salinity encountered in wastewater streams and brines, and also increase operational costs due to scaling. Collectively, most desalination systems can demand substantial energy intensity, and thus lie at the heart of the nexus between energy and water use.

Thermal desalination has been actively explored as a mechanism to complement reverse osmosis-based systems, and is a commonly-used method for desalinating high salinity waters and brines. Thermal desalination entails the evaporation of salt water and its condensation into pure water, with thermal desalination systems also demanding large energy inputs driven by non-renewable fuels. (See, e.g. N. Ghaffour, et al., *Desalination,* 2013, 309; R. Borsani, et al., *Desalination,* 2005, 182; C. Sommariva, *Desalination,* 2003, 158; M. A. Darwish, et al., *Desalination,* 1987, 64; the disclosures of which are incorporated herein by references.) One notable exception is solar desalination, which exploits a renewable source of energy and has seen great advancement in systems enabled by solar-driven interfacial evaporation. N. Ghaffour, et al., *Desalination,* 2015, 359, 94-114; M. Elimelech, et al., *Science,* 2011, 333, 712-717; P. Tao, et al., *Nat. Energy,* 2018, 3, 1031-1041; Z. Wang, et al., *Sci. Adv.,* 2019, 5, eaax04763; the disclosures of which are incorporated herein by references.) Although much work has gone into developing high-performance materials and high-efficiency system designs, solar desalination's need for high solar insolation has placed limits on its applicability in many geographic regions. Furthermore, the use of evaporation, a high-temperature phase change, may introduce additional operational costs due to scaling and corrosion.

When water is frozen and crystallized to ice, salt can separate from the ice crystals. The ice crystals can be collected for desalinated water. Compared to evaporation, the energy needed for the phase change can be reduced from about 75% to about 90%. The latent heat of fusion of ice is about 334 KJ/kg, in contrast to the heat of evaporation of water which is about 2256 KJ/kg at 100° C. Experiments showed fresh water generation through the freezing of sea ice. (See, e.g. T. Bartholinus, *Typis Matthiae Gdicchii,* 1661; R. Boyle, *New Experiments and Observations of Touching Cold Printed for John Crook.,* 1665; A. Kircher, *Mundus Subterraneus XII Libros Digestus,* 1668; the disclosures of which are incorporated herein by references.) Freezing desalination has remained an active topic of research with focus on improving its efficiency. Despite substantial work on freezing desalination, commercialization of the technology has been hampered due to the substantial energy input needed for the freezing process. (See, e.g., C. Xie, et al., *Desalination,* 2019, 435, 293-300; the disclosure of which is incorporated herein by reference.)

Many embodiments implement freezing desalination processes that can enable thermal desalination. In many embodiments, freezing desalination processes can be enabled passively by radiative heat to reduce energy input. Passive freezing desalination processes could complement thermal evaporative desalination methods, including (but not limited to) solar desalination.

Radiative Cooling

Radiative cooling of terrestrial objects involves radiative heat loss through the atmosphere's optical transmission windows into the cold space. Radiative cooling may occur when a surface under the sky is thermally emissive in the long-wavelength infrared (LWIR) atmospheric transmission window (wavelengths λ from about 8 μm to about 13 μm), and/or under sunlight if the surface is sufficiently reflective in the solar window (wavelengths λ from about 0.3 μm to about 2.5 μm). Because of the difference in temperatures of the Earth's surface (at about 290 K) and space (at about 3 K), the radiative cooling process can occur spontaneously, and can have a large net cooling effect. To passively reach temperatures substantially below the ambient, as needed for freezing, thermal emitters that selectively emit within the atmospheric window can outperform broadband emitters. (See, e.g. D. L. Zhao, et al., *Appl. Phys. Rev.,* 2019, 6, 021306; M. M. Hossain, et al., *Adv. Sci.,* 2016, 3, 1500360; the disclosures of which are incorporated herein by references.) Prior work has shown that with a selective emitter and a vacuum system to minimize non-radiative heat gain a maximal reduction of 42° C. relative to the ambient is achievable. (See, e.g., Z. Chen, et al., *Nat. Commun.,* 2016, 7, 13729; the disclosure of which is incorporated herein by reference.) In the context of desalination, an observational study showed that a natural freezing process resulted in desalination in open pools of salt water, where both evaporative and radiative cooling nominally resulted in freezing desalination. (See, e.g., J. Fournier, et al., *Desalination,* 1974, 15, 167-175; the disclosure of which is incorporated herein by reference.)

In many embodiments, passive freezing desalination processes can be initiated and driven by radiative cooling. Several embodiments provide that water with a salinity greater than about 2% can be desalinated to a salinity level that is equal to or less than about 2%. In certain embodiments, the desalinated water can be potable water. Passive freezing desalination can be competitive and complementary to solar desalination, and other thermal desalination approaches.

Radiative Cooling Freezing Desalination Process

An alternative phase change, freezing, can enable desalination. Several embodiments transfer the heat via radiative cooling to the outer space in order to enable passive freezing desalination. The outer space has a temperature of about 3 K, much lower compare to the temperature of the Earth's surface of about 290 K, and can be used as a heat sink. In certain embodiments, the radiative cooling-driven freezing desalination processes can desalinate about 37.3 g/L salt water (about 37.3% salinity) to about 1.88 g/L (about 1.88% salinity) after two stages of radiative cooling driven freezing desalination with at least 50% recovery. In some embodiments, the radiative cooling-driven freezing desalination processes can desalinate about 17.5 g/L (about 17.5% salinity) salt water to about 0.7 g/L (about 0.7% salinity) after two stages of radiative cooling driven freezing desalination with at least 65% recovery. In certain embodiments, a thermal model predicts the performance of the system could achieve as much as 20 L/m$^2$/day. Passive freezing desalination driven by radiative cooling could enable new technological possibilities for desalination. The freezing desalination processes could be a complementary method to solar desalination to enable 24 hour, year round passive thermal desalination.

FIG. 1A illustrates a process of the radiative cooling-driven freezing desalination in accordance with an embodiment. A sky-facing radiative cooler 101 transmits heat from the Earth surface 102 to the cold space 103 via thermal radiation 104. The passive radiative cooling process freezes the saltwater 105. Once frozen, the salt 106 and ice 107 separate. The higher salinity brine sinks to the bottom due to its higher density. The ice 107 forms inside the salt water because of the coldness of the radiative cooler and separates with the brine. The generated ice 107 can be collected and melted into desalinated water.

Figure 1B:
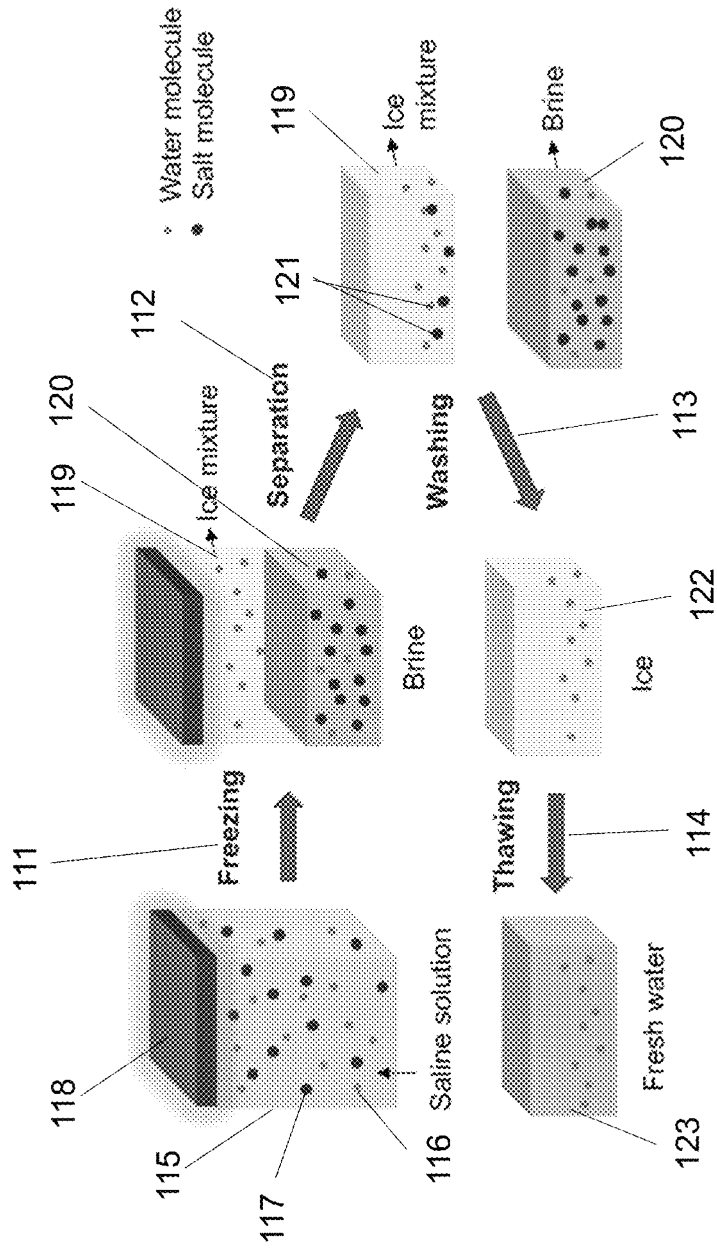
FIG. 1B illustrates a schematic of a single stage freezing desalination process in accordance with an embodiment of the invention.

FIG. 1B illustrates the various steps in the freezing desalination process in accordance with an embodiment. The radiative cooling-driven freezing desalination process can include various steps including (but not limited to) freezing 111, separating 112, washing 113, and melting 114. A water source with a salinity greater than about 35% (or about 3.5%) can be used for the freezing desalination process. Examples of the water source include (but are not limited to): brackish water, saline water, seawater, salt water, brine, and any combinations thereof. FIG. 1B shows a saline water source 115 containing water molecules 116 and salt molecules 117. The saline water 115 is a homogeneous solution and the water molecules 116 and the salt molecules 117 are dispersed evenly throughout the solution. The saline water 115 is in contact with a radiative cooler 118. The radiative cooler can transfer heat from the saline water to a colder outer space such that he saline water freezes via radiative cooling. After freezing the salt water by thermal contact with the radiative cooling surface 111, the ice 119 and the frozen brine 120 can be separated via density. In some embodiments, filters can be used to mechanically separate the ice and the frozen brine. The remaining ice 119 may have salt water pockets 121 trapped within it. Thus, the generated ice particles 119 can be washed 113 with a small volume of water. The remaining high-purity ice 122 can then be melted 114 to obtain desalinated water 123.

The radiative cooling-driven freezing desalination processes can be repeated a variety of times until the desired salinity in water is achieved. The freezing desalination can be applied to a source water. The output water from the first desalination process can be the source water of the second desalination process. The salinity of the output water can be determined before proceeding to the second desalination process. The second desalination process can be similar to the first desalination process. The desalination process can be repeated as many times as needed until the desired salinity is reached. Several embodiments implement a two-stage desalination process where the passive freezing desalination process is repeated twice. Some embodiments implement a three-stage desalination process where the passive freezing desalination process is repeated three times.

Various methods can be used to improve water quality. In some embodiments, washing processes can be applied post crystallization to enhance crystal quality. In certain embodiments, in addition to the washing method, a sweating process can be added as a post treatment to remove brine trapped within ice crystals. Sweating is a method by which ice layer is purified under the effect of temperature gradient. The main kinetic parameters influencing sweating of ice are initial concentration of ice, sweating temperature and sweating time. Sweating can enable the obtention of ice with low salt concentration. The salinity of a saline solution can be reduced from 35 g/kg to 0.5 g/kg at about 0° C. after optimization of the freezing condition and sweating step.

Several embodiments may add ice seeds to induce nucleation in order to improve water quality in the freezing process. Without an ice seed, the water usually has a supercooling state, which can be beneficial as it forms dendritic ice crystals. However, at the end of the supercooling stage, impurities such as any remaining brine can get trapped between dendritic ice crystals, which in turn can lower the quality of produced water. By adding an ice seed, the supercooling state can terminate quickly and ice crystals can be formed shortly thereafter. In several embodiments, seeding the ice is utilized in freezing desalination by reducing supercooling and increasing water quality.

Figure 2B:
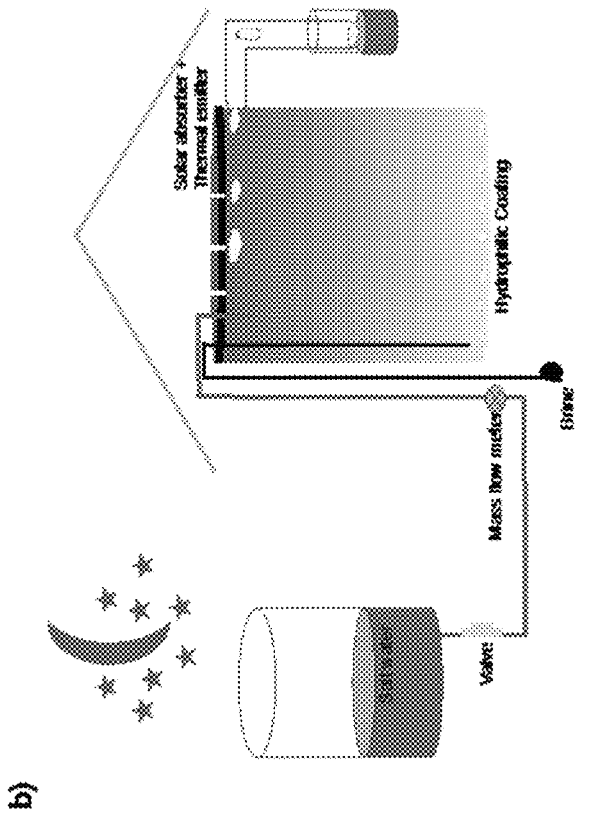
FIGS. 2A-2B illustrate a framework of the combination of solar desalination and radiative cooling freezing desalination process in accordance with an embodiment of the invention.
Figure 2A:
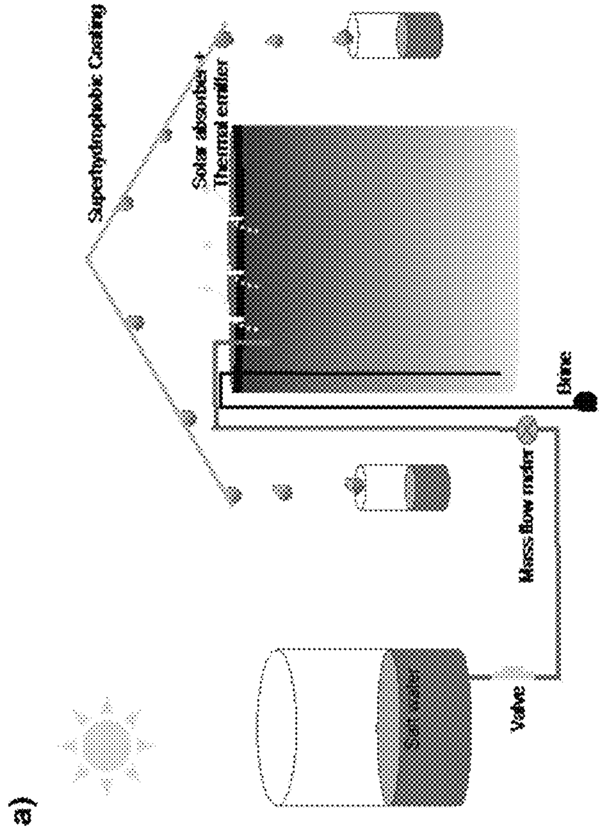

Many embodiments provide that radiative cooling freezing desalination can be combined with solar desalination to enable 24-hour, year-round passive thermal desalination. FIGS. 2A and 2B illustrate a continuous system to achieve solar desalination and radiative cooling freezing desalination in the same equipment in accordance with an embodiment. In FIG. 2A, during the day, most of the solar energy can be absorbed as a result of the solar absorber above the container, which leads to heating of saltwater in the container. The water that evaporates and cools down on the top becomes freshwater. In FIG. 2B, during the night, the thermal radiation to outer space through the atmospheric window can be maximized because of the radiative cooler on the top, achieving cooling performance and making the saltwater freeze. Fresh water can be collected after melting the ice.

Several embodiments provide that the surface properties of containers and/or collecting devices can be modified to improve the ice collection efficiency. FIG. 2B illustrates that the hydrophilic surface can improve the ice nucleation efficiency as water is more likely to form ice on a hydrophilic surface rather than the hydrophobic surface. Besides, the hydrophilic coating can provide the nucleation site, which avoids the supercooling problem.

A number of embodiments provide improved washing methods by having a hydrophilic surface on the bottom. When freezing happens, the lower density of smaller ice on the bottom may float to the top, and can be washed by the flowing water down from the top. The counter-flowing of water and ice may wash out the salt sticking to the ice particles. Therefore, the collected ice on the top can contain less salt.

Many embodiments provide heat transfer mechanisms behind the passive freezing processes to desalination. Consider a radiative cooler of a surface area A at temperature T. When the radiative cooler is exposed to the night sky, it is subject to downwelling atmospheric thermal irradiance (corresponding to ambient air temperature $T_{amb}$) as well as non-radiative heat exchange to its surroundings. The net cooling power $P_{net}$ achievable by the radiative cooler is given by:

$$P_{net}(T) = P_{rad}(T) - P_{atm}(T_{amb}) - P_{cond+conv} \tag{1}$$

In Eq. (1) the power radiated out by the radiative cooling surface is:

$$P_{rad}(T) = A\int d\Omega\cos\theta\int_0^\infty d\lambda I_{BB}(T,\lambda)\varepsilon(\lambda,\theta) \tag{2}$$

Here $$\int d\Omega = 2\pi\int_0^{\pi/2}$$

is the angular integral over a hemisphere.

$$I_{BB}(T,\lambda) = \frac{2hc^2}{\lambda^5}\frac{1}{e^{hc/(\lambda k_B T)} - 1}$$

is the spectral radiance of a blackbody at temperature T, where h is Planck's constant, $k_B$ is the Boltzmann constant, c is the speed of light and λ is the wavelength.

$$P_{atm}(T_{amb}) = A\int d\Omega\cos\theta\int_0^\infty d\lambda I_{BB}(T_{amb},\lambda)\varepsilon(\lambda,\theta)\varepsilon_{atm}(\lambda,\theta) \tag{3}$$

is the absorbed downwelling atmospheric irradiance over long-wave infrared wavelengths. Finally, heat gained due to conduction and convection $P_{cond+conv}$ can be expressed based on a combined effective heat transfer coefficient h, as:

$$P_{cond+conv}(T, T_{amb}) = Ah_c(T_{amb} - T) \tag{4}$$

A selective thermal emitter can have high emittance within the atmospheric window (8-13 μm) and low emittance elsewhere. For below-ambient cooling (i.e. $T<T_{amb}$), a broadband thermal emitter stands to gain heat from thermal radiation outside the atmospheric window than it loses in net through thermal emission within the window, potentially resulting in a negative cooling power, and limiting the lowest temperature achievable. By contrast, a selective emitter may enable maximize $P_{net}(T)$ and thereby achieve a lower temperature, which is essential for freezing desalination.

At the onset of freezing, the maximum mass of ice that can be formed from thermodynamic considerations alone can be understood by equation the net cooling power $P_{net}$ at that temperature to mf, the mass of salt water and $H_f$ the enthalpy of fusion of water, which is about 334 KJ/kg.

$$P_{net} = m_f H_f \tag{5}$$

Figure 3:
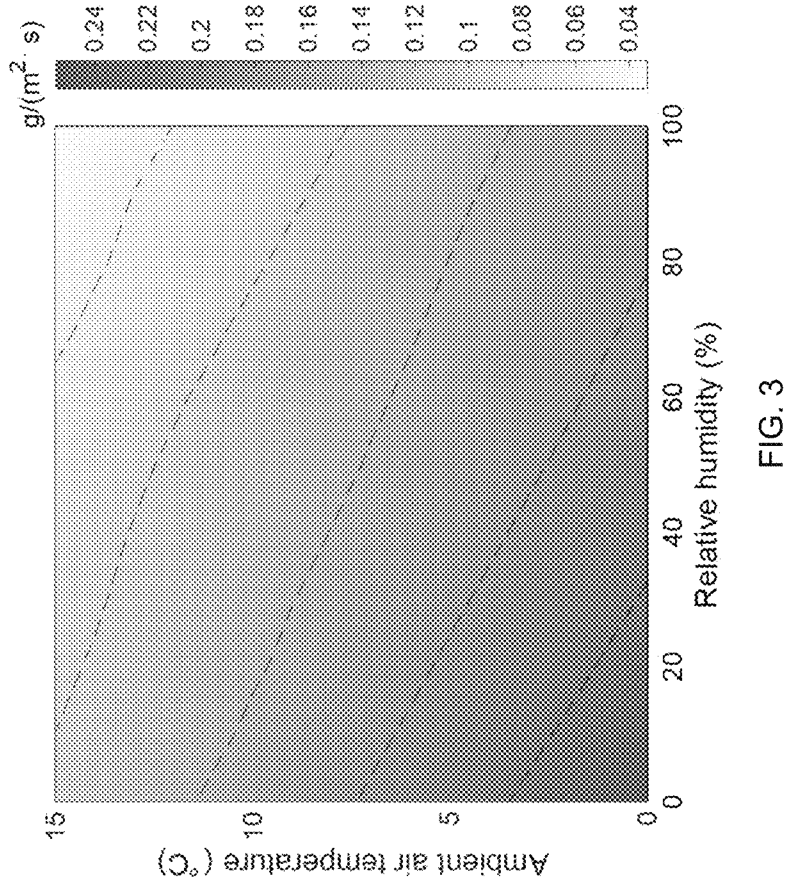
FIG. 3 illustrates the water production rate at the freezing point by radiative cooling freezing desalination in accordance with an embodiment of the invention.

Several embodiments provide the maximum ice generation rate per second at a temperature of about −2° C. for a range of air temperatures and relative humidity conditions using an ideal selective emitter. FIG. 3 shows the first-order thermodynamic prediction for the water production rate at the freezing point for 35 g/L salt water at around −2° C. by radiative cooling freezing desalination at different relative humidity and ambient temperatures in accordance with an embodiment. The calculations are performed for a range of air temperatures and relative humidity in clear sky conditions using an ideal selective emitter with unity emissivity between wavelength from about 8 μm to about 13 μm, and zero emissivity elsewhere, and no non-radiative heat exchange (vacuum insulation). Expected freezing output limits range from about 0.06 to about 0.24 g/m²·s freshwater, with meaningful generation accessible at air temperatures as high as 15-20° C. While some embodiments provide the first-order thermodynamic approximation, it does indicate the potential of radiative cooling to enable meaningful ice generation for a range of weather conditions. In a full implementation of such a system, to enable truly passive operation, the radiative cooling surface can be responsible for cooling the saline solution to the onset of freezing, and the kinetics of the freezing process may determine the nature of crystallization.

Some embodiments implement various setups for passive freezing desalination driven by radiative cooling. Containers can be used for holding a saline water source. Containers can be (but not limited to) buckets, tubs, reservoirs, boxes, sinks, tubes, and any combinations thereof. The container can be made of various materials including (but not limited to) metal, metal alloy, aluminum, aluminum alloy, steel, plastic, polymer, and any combinations thereof. The container can be surrounded by a thermal conductive material. The container can be in direct contact with at least one radiative surface. The radiative surface can be a part of a radiative cooler. The radiative surface comprises a selective thermal emitter. The selective thermal emitter has a high emissivity between electromagnetic wavelengths of about 8 μm and about 13 μm, and a low emissivity between electromagnetic wavelengths of about 0.3 μm and about 2.5 μm. A high emissivity can be greater than or equal to about 0.5 and less than or equal to about 1. A low emissivity can be greater than or equal to about 0 and less than about 0.5. Examples of a selective thermal emitter include (but are not limited to) an acrylic polymer, indium tin oxide, aluminum oxide, hafnium oxide, and any combinations thereof. The container and the radiative surface can be placed in an insulating container to minimize the thermal emittance from the setup itself. Various thermal insulating methods and/or thermal materials can be applied to the insulating container. Examples of the thermal insulating materials include (but are not limited to) polyurethane, polyurethane foam, polystyrene, cellulose, mylar, low density polyethylene, high density polyethylene, polyester, polyisocyanurate, fiberglass, wool, reflective foil, natural fiber, and any combinations thereof. The insulating materials can be placed in various layers with air gap in between. In some embodiments, multi-layer insulation can be used to improve cooling performance. In one example, double layer low density polyethylene and/or single layer low density polyethylene can be used for insulation.

Figure 4A:
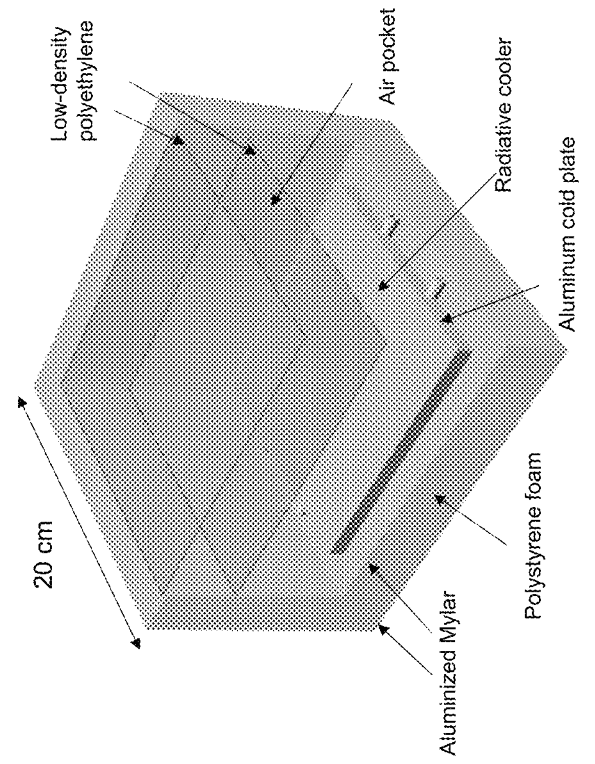
FIG. 4A illustrates an apparatus for radiative freezing desalination in accordance with an embodiment of the invention.

FIG. 4A illustrates a schematic of a radiative cooling apparatus in accordance with an embodiment. A cold plate with two tubes can be used to place the salt water in thermal contact with the radiative cooler (or a radiative cooling surface), while the rest of the apparatus can minimize conductive and convective heat exchange to the cooler. The radiative cooling surface can be made of a low-cost acrylic polymer including (but not limited to): tape coated with silver. Any types of tape can be used such as scotch tape. The radiative cooling surface can then be affixed to an aluminum cold plate which contains two tubes for water. The plate and radiative cooling surface are placed inside a polystyrene box which is covered with aluminized mylar both inside and outside to minimize its own emittance. Two clear polyethylene films with thickness of about 12.5 μm are placed above the sample at a distance of about 7 cm as an infrared-transparent windshield to enable effective, yet low-cost insulation.

Figure 4B:
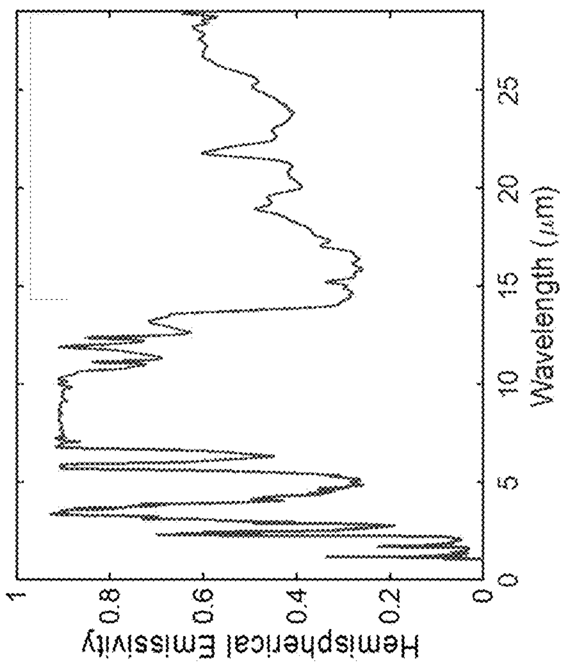
FIG. 4B illustrates an apparatus for hemispherical emissivity of the acrylic polymer in accordance with an embodiment of the invention.

FIG. 4B illustrates hemispherical emissivity measurements of the radiative cooling surface in accordance with an embodiment. The measured hemispherical emissivity shows that it possesses a selective thermal emittance with high emittance in the atmospheric window.

Figures 5A, 5B, 5C, 5D, 5E, 5F:
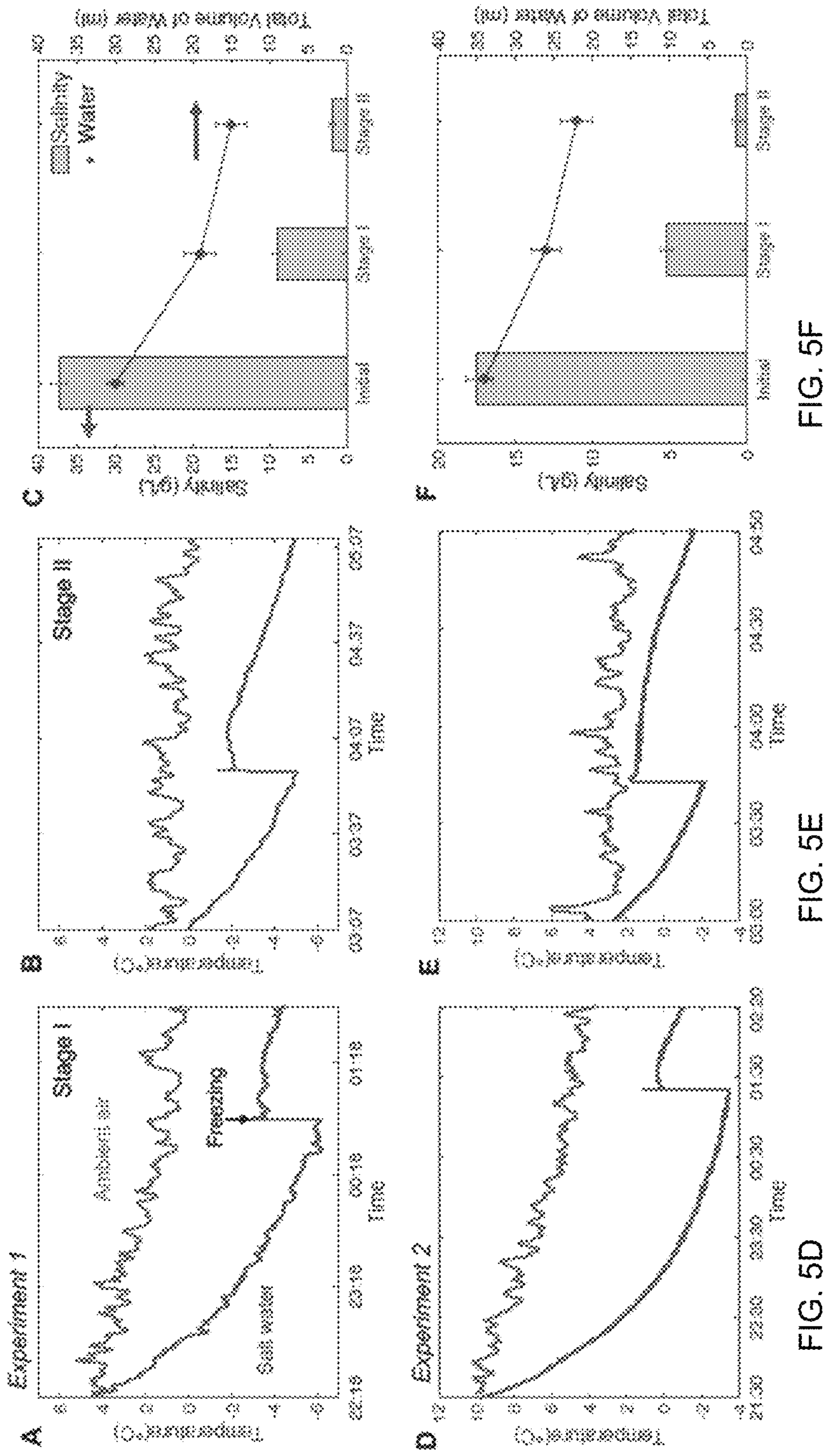
FIGS. 5A-5B illustrate first stage and second stage measurement of a high salinity salt water temperature against ambient air temperature in accordance with an embodiment of the invention.
FIG. 5C illustrates salinity measurement of the two desalination stages in accordance with an embodiment of the invention.
FIGS. 5D-5E illustrate first stage and second stage measurement of a low salinity salt water temperature against ambient air temperature in accordance with an embodiment of the invention.
FIG. 5F illustrates salinity measurement of the two desalination stages in accordance with an embodiment of the invention.

The performance of the radiative cooling desalination can be recorded by exposing a freezing desalination apparatus to the sky during night-time hours. The containers for saline water such as tubes placed in the cold plate can be filled with about 30 mL of salt water with a salinity at about 37.3 g/L, approximately the salinity of seawater. FIG. 5A illustrates first stage measurement of the salt water temperature against ambient air temperature in accordance with an embodiment. Not long after the cooler is exposed to the environment (shortly before 22:30 in FIG. 5A), the salt water temperature drops to approximately 8° C. below the measured ambient air temperature. The temperature of the saltwater reaches about −6.2° C. around 00:40 at which point it rises rapidly to −2.98° C., a signature of the onset of freezing. The temperature of the forming ice/water slurry then slowly drops to about −4.5° C. during the crystallization process. The temperature range can result in approximately 75% crystallization. The ice/water and brine mixture can be removed from the tube and mechanically separate the ice and brine using a paper filtration system. About 3.5 mL of fresh water can be used to wash the formed ice crystals to remove the attached brine on the surface of the ice crystal. 19 mL of water with a salinity of about 8.99 g/L is obtained after melting the ice crystals, as shown in FIG. 5C.

The partially desalinated water from the first stage can be re-inserted back into the tube of the cold plate. A similar desalination process can be repeated for a second stage of freezing desalination. FIG. 5B illustrates second stage measure of the first stage's salt water temperature against ambient air temperature in accordance with an embodiment. After the cooler is exposed to the environment (at 03:07 in FIG. 5B), the salt water temperature drops to around −5° C. at 04:00 and immediately rises to about −1.35° C. because of the lower salinity of the salt water. A separation process can be performed using about 2.5 mL of fresh water to wash the formed ice crystals. After the second stage's desalination process, about 15 mL with a salinity of 1.88 g/L water can be obtained (FIG. 5C), representing about 50% recovery rate from the 30 mL salt water initially introduced into the system.

FIG. 5C illustrates the salinity measurement of the two desalination stages in accordance with an embodiment. The salinity of water drops from about 37.3 g/L to about 8.99 g/L at the first stage with a 11 mL water loss. The salinity drops from about 8.99 g/L to about 1.88 g/L at the second stage with a 4 mL water loss.

A saline water with a lower salinity is used in the passive freezing desalination process in accordance with various embodiments. The tubes in the cold plate can be filled with about 34 mL of salt water at about 17.5 g/L input salinity. FIG. 5D illustrates first stage measurement of the lower salinity salt water temperature against ambient air temperature in accordance with an embodiment. As shown in the temperature data, immediately after the cooler is exposed to the environment (at 21:30), the salt water temperature drops to approximately 13° C. below the measured ambient air temperature, a deep sub-ambient cooling effect enabled by the selective thermal emitter. The temperature of the saltwater reaches about −3.5° C. at around 01:10 at which point it rises rapidly to about 1.1° C., at freezing onset. The temperature of the forming ice/water slurry then slowly drops to about −1.2° C. during the crystallization process. The ice and brine can be mechanically separated using about 3.5 mL of fresh water to wash the formed ice crystals to remove the attached brine on the surface of the ice crystal.

About 26 mL of water with a salinity of about 5.2 g/L is obtained after melting the ice crystals, as shown in FIG. 5F.

The partially desalinated water from the first stage can be re-inserted back into the tube of the cold plate. A similar desalination process can be repeated for a second stage of freezing desalination. FIG. 5E illustrates second stage measure of the first stage's salt water temperature against ambient air temperature in accordance with an embodiment. 26 mL of 5.2 g/L salinity saltwater can be re-inserted back into the tube of the cold plate. A second desalination process can be performed. As shown in the temperature data of FIG. 5E, after the cooler is exposed to the environment (at 03:00), its temperature drops to around −2° C. at 03:45 and immediately rises to about 2° C. because of the lower salinity of the salt water. Then a separation process can be performed using about 2.5 mL of fresh water to wash the ice crystals. After the second stage's desalination process, about 22 mL of water at a salinity of 0.7 g/L can be obtained (FIG. 5F), about a 65% recovery rate from the 34 mL salt water initially introduced into the system.

FIG. 5F illustrates the salinity measurement of the two desalination stages in accordance with an embodiment. The salinity of water drops from about 17.5 g/L to about 5.2 g/L at the first stage with a 8 mL water loss. The salinity drops from about 5.2 g/L to about 0.7 g/L at the second stage with a 2 mL water loss.

In many embodiments, after the first stage of the desalination process, the salinity of saltwater decreases about 70-75% while there is also about 8-11 mL water loss. Previous work has shown that, in freezing desalination systems, as the residual liquid volume reduces, the removal efficiency decreases due to the difficulty in maintaining regular contact between the liquid and solid phases. (See, e.g., Y. Zhang, et al., *ACS Appl. Mater. Interfaces,* 2016, 8, 17583-17590; the disclosure of which is incorporated herein by reference.) Freezing in general can cause impurities to be trapped inside ice crystals relative to the fraction of the solution that remains unfrozen. This in turn can result in lower separation efficiency of the salt-water solution. Several embodiments show that the pump for mechanical separation consumes about 30 J during the desalination process. This however corresponds to less than 0.5% of the total energy that would otherwise be needed to freeze 19 mL of salt water. This energy consumption is thus negligible relative to the effective energy savings made possible by the passive radiative cooling process.

Modeling Freezing Desalination

A model for the developed freezing desalination system can be used to validate against the measurement results and then used to predict the net freshwater yield of radiative-cooling freezing desalination systems in a range of climate zones. Given input environmental conditions (air temperature and dew point), as well as the mass of water in the system, the model first predicts the cooling curve for water in the radiative cooling apparatus. FIGS. 6A-6F illustrate validating the model against experimental temperatures and water production rates in accordance with an embodiment.

Figures 6A, 6B, 6C, 6D, 6E, 6F:
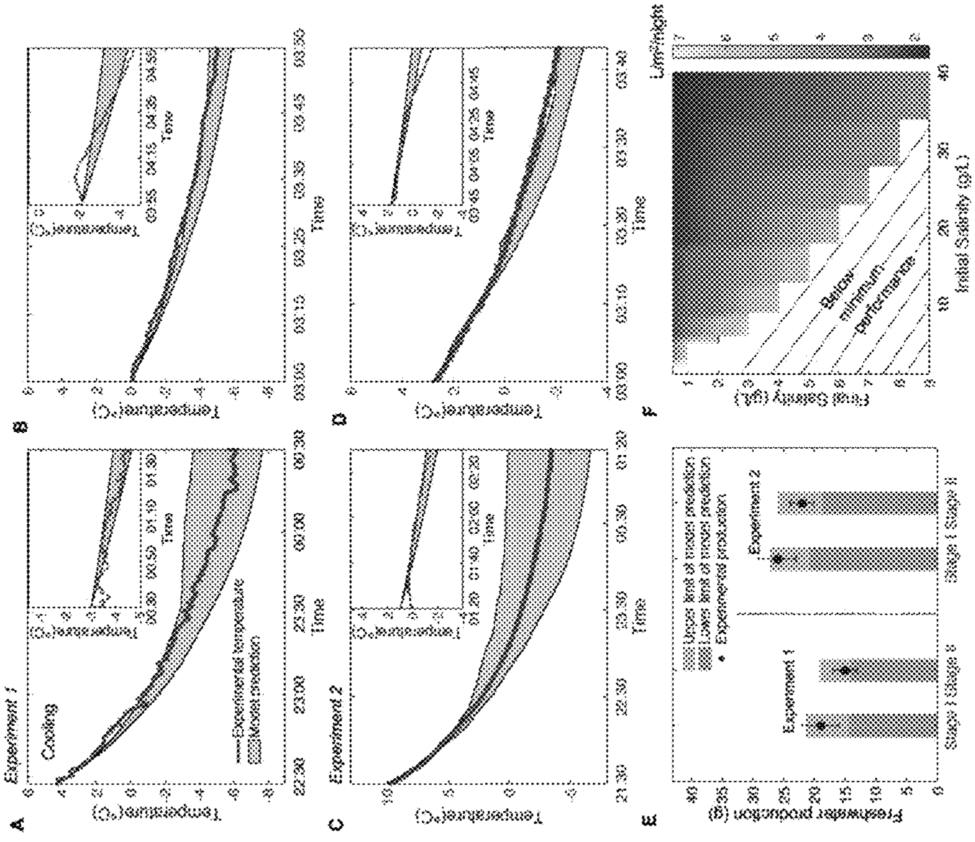
FIGS. 6A-6F illustrate validating the model against experimental temperatures and water production rates in accordance with an embodiment.

FIG. 6A illustrates the model predictions vs. experimentally measured saltwater (at about 37.3 g/L salt concentration) during the first stage. The model prediction regions denote model uncertainty associated with the coefficient of non-radiative heat exchange which is modeled in a range of potential values. FIG. 6B illustrates the model predictions vs. experimentally measured saltwater (at about 37.3 g/L salt concentration) during the second stage. In FIG. 6A, the model's prediction for the temperature of the saltwater at an input salinity of 37.3 g/L for a range of non-radiative coefficients of heat exchange is compared against the first stage experimental data in FIG. 6A and the second stage in FIG. 6B, showing good agreement.

FIG. 6C illustrates the model predictions vs. experimentally measured saltwater (at about 17.5 g/L salt concentration) during the first stage. FIG. 6D illustrates the model predictions vs. experimentally measured saltwater (at about 17.5 g/L salt concentration) during the second stage. The temperatures of saltwater for the lower input salinity experiment (at about 17.5 g/L) for both stages are also simulated by the model, and shown in FIG. 6C and FIG. 6D, also showing good agreement.

FIG. 6E illustrates the modeled total freshwater production from saltwater vs. experimentally yielded quantities. FIG. 6F illustrates modeled total freshwater production using the experimental apparatus for different input salinities given weather conditions during experiments, and assuming the use of up to three consecutive stages. The model then uses this information, as well as phenomenologically derived assumptions about when freezing onset occurs, and the associated temperature rise of the saline solution, to predict a range of expected freshwater production rates for a particular set of operating conditions. The model's predicted range of freshwater production is shown in FIG. 6E and is validated against the values obtained experimentally showing excellent overall agreement.

Figure 7:
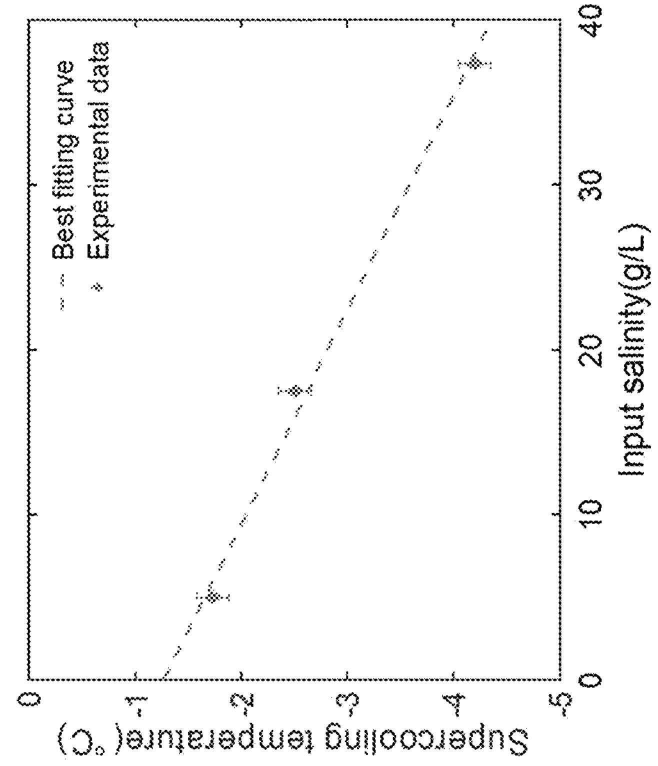
FIG. 7 illustrates supercooling as a function of input salinity in accordance with an embodiment.

The validated model is used to predict the nightly freshwater output of the apparatus for different input and output salinities under the same set of environmental conditions as the experiments. The higher the salinity of input saltwater, the harder it will be for it to freeze, as it will have to reach lower supercooling temperatures. FIG. 7 illustrates supercooling as a function of input salinity in accordance with an embodiment. FIG. 7 shows measured supercooling temperatures for different input salinities during the freezing desalination process in the apparatus.

Figure 8:
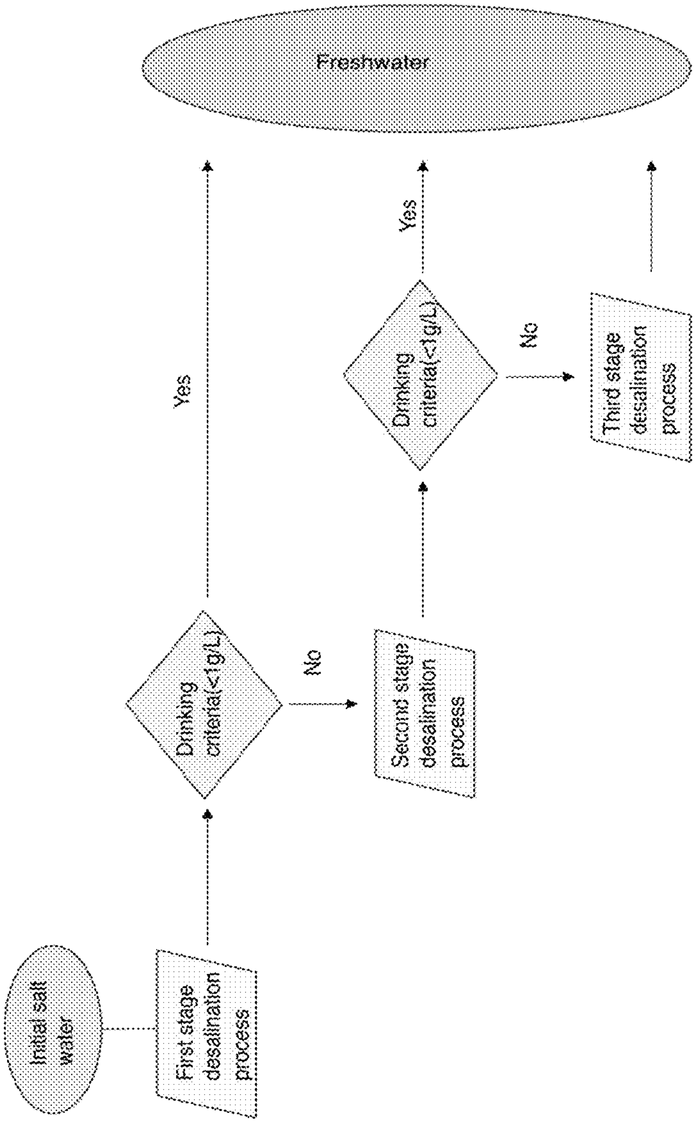
FIG. 8 illustrates a multi-stage decision process for passive freezing desalination in accordance with an embodiment.

Furthermore, higher salinities can necessitate multiple stages of freezing and washing. Using the experimental implementation as a phenomenological baseline for the values of the input and output salinities achievable for experimental stage (with a maximum of four stages total set as an upper limit), the expected number of desalination stages needed as a function of input salinity can be established. FIG. 8 illustrates a multi-stage decision process for passive freezing desalination in accordance with an embodiment. Flow chart in FIG. 8 showing the decision flow in the developed model to determine the number of radiative cooling freezing desalination stages needed for a given initial input salinity. The model demonstrates that it can take three stages to desalinate freshwater from higher salinity water (greater than or equal to about 37.3 g/L), and takes fewer stages for lower input salinities.

Figure 9B:
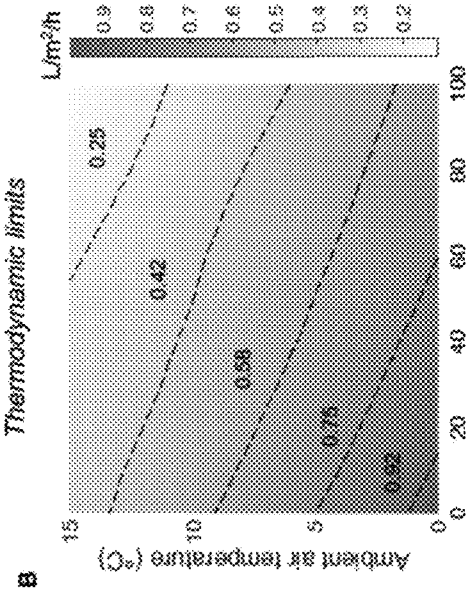
FIGS. 9A-9D illustrate predicting performance and thermodynamic limits across a range of climate zones in accordance with an embodiment of the invention.
Figure 9D:
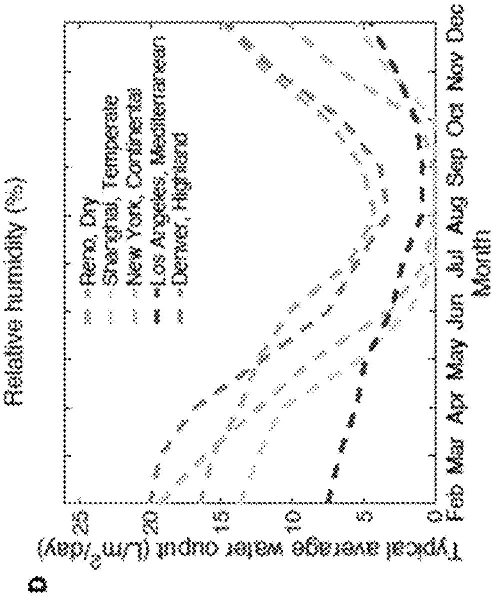
Figure 9A:
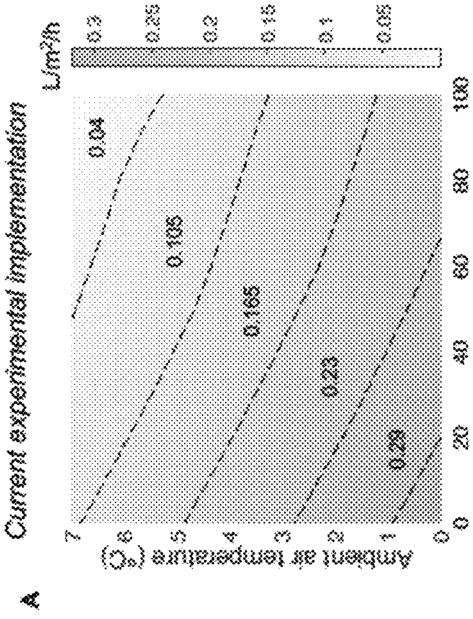
Figure 9C:
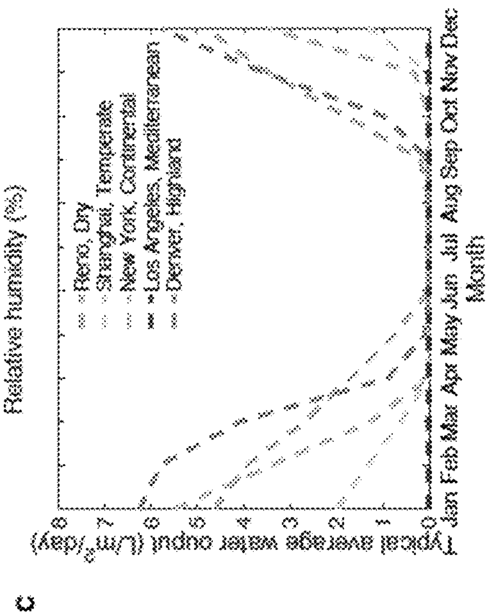

FIGS. 9A-9D illustrate predicting performance and thermodynamic limits across a range of climate zones in accordance with an embodiment of the invention. For seawater desalination (input salinity of about 35 g/L), based on the implementation (cold plate, radiative cooling material and apparatus insulation as shown in FIG. 4A) the performance of the system at different ambient temperatures and relative humidity is shown in FIG. 9A. In this model, assuming that there is no supercooling resulting in freezing onset. FIG. 9A shows model prediction of the amount of water produced hourly by radiative cooling freezing desalination assuming the current experimental implementation for different relative humidity and ambient temperatures. FIG. 9B shows single-state thermodynamic limit of hourly water production by radiative cooling freezing desalination for different relative humidity and ambient temperatures. FIG. 9C shows prediction of average daily water production each month of the current experimental implementation using typical meteorological year (TMY3) weather data for cities located in five different climate zones. FIG. 9D shows single-state thermodynamic limit of average daily water production each month for the same cities located in five different climate zones.

Many embodiments provide a thermodynamic model of an ideal freezing desalination system. The model assumes that the mass of the cold plate is negligible, that the radiative cooling surface is under vacuum, that the radiative cooler is an ideal selective thermal emitter (with unity emissivity between 8-13 μm and 0 at other wavelengths), that the convective shield has perfect transmittance and that there is no supercooling resulting in freezing onset exactly at the freezing point of 35 g/L salt water (−2° C.). The performance predictions under these assumptions for different ambient temperatures and relative humidity is shown in FIG. 9B. For the ideal case, as much as 0.9 L/m$^2$/h freshwater can be generated using this method, which compares favorably with common solar desalination production values of 0.3-0.7 L/m$^2$/h under the standard one Sun illumination condition (1 kW/m$^2$), but is lower than the theoretical limit of hourly averaged production values for a multi-stage solar desalination system, 10 L/m$^2$/h.

To assess the techno-economic viability of this approach to desalination, the model is applied using typical meteorological year (TMY3) data for cities in five different climate zones: dry, temperate, continental, Mediterranean, and highland climates. The amount of water produced by radiative cooling freezing desalination daily based on both the current experimental implementation are shown in FIG. 9C, as well as the production from the ideal passive radiative cooling-driven freezing desalination system in FIG. 9D. In all cases, solar energy is absorbed by the radiative cooler based on its current solar reflectivity. Overall, the highest production during non-summer months when solar irradiance and ambient temperatures are cooler in all five climate zones. However, as shown in FIG. 9D, with further improvements meaningful production can occur during low solar irradiance hours in the summer as well. As can be seen in Table 1, the dry and highland climate zones are optimal climate zones due to many hours of relatively cooler air temperatures and lower relative humidity. However, in winter months with relatively solar irradiance, this approach may outperform solar desalination-based approaches. Table 1 shows annual average daily water production of 1 g/L water at different initial input salinities using both the current ('Real') and an idealized ('Ideal') radiative cooling freezing desalination system for the identified cities in five different climate zones. The dry and highland climate zones are notably the preferred climate zones for passive freezing desalination.

TABLE 1

Expected production rate across a range of climate zones. Modeled annual average daily water production with passive freezing desalination for the identified cities in five different climate zones.

| System configuration | Initial salinity | Dry Reno | Temperate Shanghai | Continental New York | Mediterranean Los Angeles | Highland Denver |
|---|---|---|---|---|---|---|
| Ideal | 35 g/L | 11.21 L/m$^2$ | 5.03 L/m$^2$ | 7.8 L/m$^2$ | 3.9 L/m$^2$ | 11.57 L/m$^2$ |
| Ideal | 17.5 g/L | 12.4 L/m$^2$ | 5.93 L/m$^2$ | 9 L/m$^2$ | 5 L/m$^2$ | 12.9 L/m$^2$ |
| Real | 35 g/L | 2 L/m$^2$ | 0.43 L/m$^2$ | 1.16 L/m$^2$ | 0 L/m$^2$ | 2.27 L/m$^2$ |
| Real | 17.5 g/L | 2.57 L/m$^2$ | 0.65 L/m$^2$ | 1.4 L/m$^2$ | 0.2 L/m$^2$ | 2.77 /m$^2$ |

Figure 10:
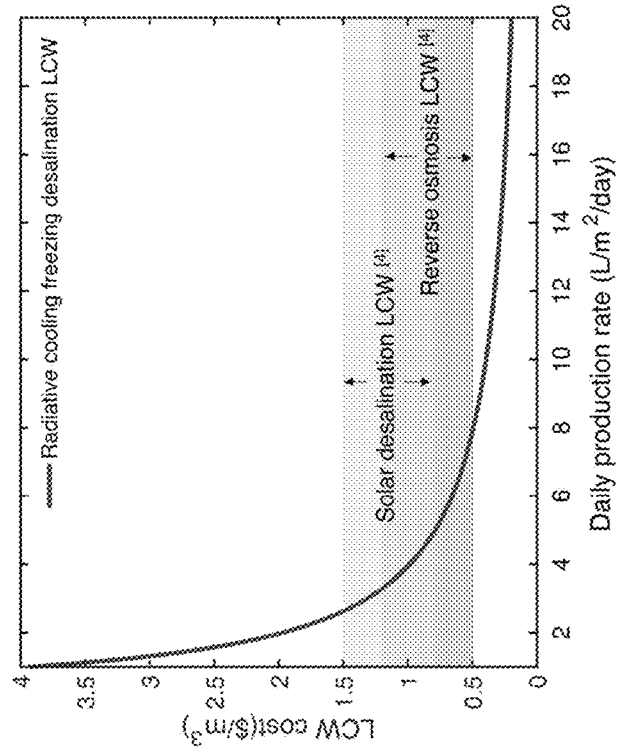
FIG. 10 illustrates levelized cost of water vs. daily production rate in accordance with an embodiment.

While FIGS. 9A-9D examine the system's performance in terms of production capacity, the rates should be compared against system costs. As an example, a first order levelized cost of water (LCW) analysis can be used for the passive freezing desalination system and benchmarked against LCW ranges for other desalination methods. FIG. 10 illustrates levelized cost of water vs. daily production rate in accordance with an embodiment. LCW estimates of radiative cooling drive freezing desalination as a function of fresh water production rate, assuming sea water as the input. The results indicate that, based on current performance, the system holds the potential to compete favorably with solar desalination. With further improvements it may also compare well with membrane desalination in the climate zones identified in FIG. 9D. As shown in FIG. 10, production rates of about 2-5 L/m$^2$/day, achievable with the system as it would currently performs in range of climate zones (FIG. 9C), could yield LCW in the range from about $1.5 to about $0.75/m$^3$, competitive with solar desalination. With the theoretical limits of performance shown in FIG. 9D, FIG. 10 indicates that LCW could be achieved that would be competitive with membrane desalination systems in a range of climate zones. The current implementation's costs are driven by small-volume manufacturing of the cold plate used, as well as performance due to non-ideal infrared selectivity as well as supercooling. Improvements on both these fronts are possible with increased manufacturing scale, as well as further advancements in selective radiative coolers. For climate zones with relatively low solar irradiance during large fractions of the year, radiative cooling-driven desalination may represent a compelling renewable thermal desalination approach, including to remediate saline wastewater in industrial, and oil and gas facilities.

EXEMPLARY EMBODIMENTS

Although specific embodiments of systems and apparatuses are discussed in the following sections, it will be understood that these embodiments are provided as exemplary and are not intended to be limiting.

Example 1: Desalination Measurements

Desalination experiments were performed on a flat surface in Big Bear Lake, California, USA. The freezing desalination apparatus include a 2-inch-thick polystyrene foam enclosure covered by a layer of aluminized Mylar. A polished, custom-fabricated aluminum cold plate of dimensions 15 cm×15 cm is inserted into the enclosure and the radiative cooler is placed into thermal contact on its top surface. The radiative cooler is made of 3M Scotch tape coated with silver by physical vapor deposition, and had the same area as the cold plate. Two layers of 12.5 μm low-density polyethylene (LDPE) film is then used to seal the top of the box and serve as an infrared-transparent insulating shield. This design creates a well-sealed air pocket around the sample, which provides effective insulation. A thermocouple with about ±0.25° C. accuracy was then inserted into the cold tube and sealed by wax. The Ambient air temperature is measured by another thermocouple with ±0.25° C. accuracy in an area with free air flow near the sample, but outside the apparatus. The thermocouples were connected to a data logger.

Salt water was prepared, and its salinity measured, prior to its insertion into the cold tube. The apparatus was then exposed to the clear night sky. After freezing onset and subsequent temperature decrease, the generated ice and brine in the cold tube were poured into a vacuum filtration system. The system includes a 500 mL filter flask, 9 cm porcelain buchner funnel, 9 cm filter paper, pre-drilled rubber stopper and ⅜ inch vacuum tubing with a ¼ in adapter sleeve. A 1 W vacuum pump is then used for 15 s. The solid ice particles cannot pass through the filter medium and remain in the filter. These ice particles are then collected and washed by a small quantity of pure water (between 2.5 and 3.5 mL depending on the experiment) that was rapidly flowed across them. After washing, the ice crystals were transferred into a beaker. The ice was then melted and its salinity measured using a LCD salinity meter with an accuracy of +2%. The desalinated water was then re-inserted into the cold tube and the process repeated for a second stage of freezing desalination.

Example 2: Spectral Characterization of the Radiative Cooler

The hemispherical emissivity of the radiative cooler can be measured by an FTIR spectrometer. Emissivity is measured by angular reflectance measurements from 0° to 90° with integrating sphere and averaged using Eq. (6). Strong thermal emissivity in the atmospheric window between 8 μm and 13 μm can be observed.

$$\varepsilon_\lambda = \frac{\int_0^{2\pi}\int_0^{\pi/2} \varepsilon_{\lambda,\theta}(\lambda,\theta,\phi)\cos\theta\sin\theta d\theta d\phi}{\int_0^{2\pi}\int_0^{\pi/2} \cos\theta\sin\theta d\theta d\phi} \tag{6}$$

Example 3: Water Output in Different Climate Zones

To model water output in different climate zones, hourly typical meterological year (TMY3) data for each city was used. Average hourly ambient temperatures of the cities studied are provided for a typical year by the TMY3 temperature file. In using this data, the ambient temperature is assumed to be constant during each hour segment. The amount of water produced by radiative cooling freezing desalination on a daily basis based on both the current experimental implementation and ideal conditions are shown in FIGS. 9C and 9D.

Example 4: Heat-Transfer Model

To model the apparatus's performance both during the experiment and afterwards, a heat transfer model is developed to capture relevant flows of heat in the device. For radiative heat transfer, Equation (2) and (3) are used. While the radiative cooler's emittance uses the experimentally measured value, the atmospheric emittance $\varepsilon_{atm}$ is calculated from $I_{sky}(\lambda)$. For this calculation, weather and location date to model $I_{sky}(\lambda)$ are used. Parameters used for the modelling included location, time and total precipitable water (TPW) in the atmosphere. The experiment at the Big Bear Lake, California test site is located at an altitude of 7400 ft. For the first experiment, the TPW was 11 mm, while for the second experiment, the TPW was 7.5 mm. A clear, cloudless sky was observed and thus assumed for the model.

Figure 11B:
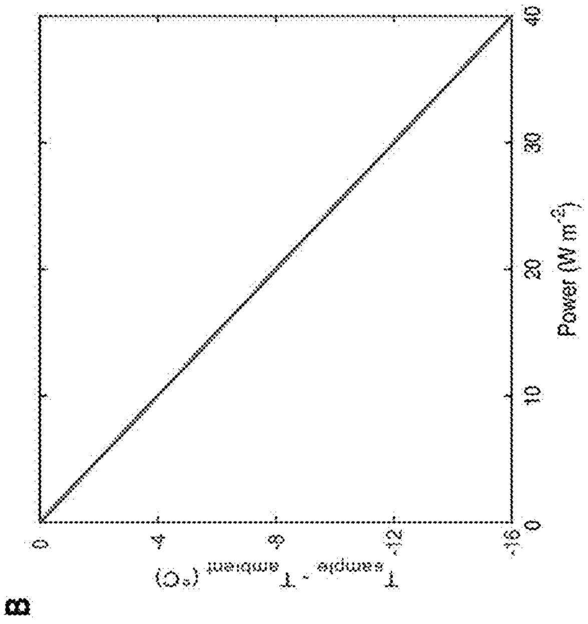
FIGS. 11A-11B illustrate heat-transfer modeling of the experimental apparatus in accordance with an embodiment.
Figure 11A:
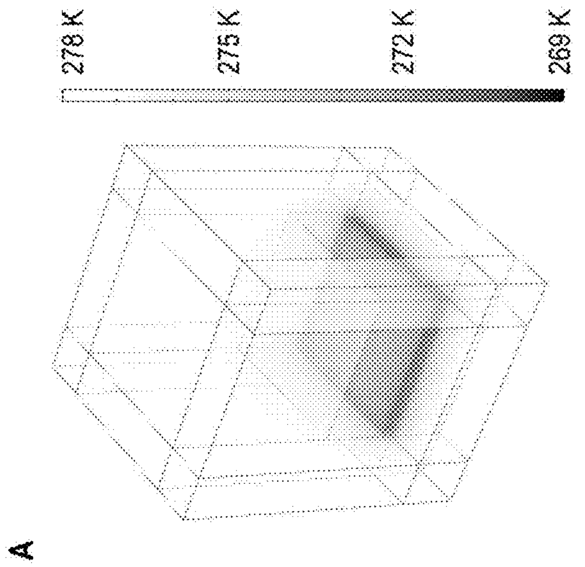

Heat-transfer simulations can be performed in order to better understand convective and conductive loss mechanisms in accordance with some embodiments. Simulations can be used to quantify $P_{cond+conv}$ and $h_c$ as defined in Eq. (4). The model simulates the experimental setup in three dimensions with four objects: a thin radiator, two thin layer low-density polyethylene, surrounding air and the supporting polystyrene block as is shown in FIG. 11A. FIG. 11A illustrates a numerical (finite-element) heat transfer simulation of the apparatus and radiative cooler yields a temperature distribution within the geometry that considers non-radiative heat exchange in the apparatus. FIG. 11B illustrates simulation calculation for $P_{cond+conv}$ as a function of $T_{sample}-T_{ambient}$ (line) yields a value of $h_c$=2.5 W $m^{-2}$ $K^{-1}$, which is within the range between 2-4 W/$m^2$/K in the theoretical model to compare against experimental data in FIGS. 6A-6D grey region. The air temperature and the conductive properties of all objects and the value of the heat flux $P_{out}$ that is leaving the radiator can be defined, allowing to infer $P_{cond+conv}$ according to the radiator's temperature T. The outside boundaries of the system (shown at the top of FIG. 11A) are set to the air temperature. The simulation handles the fluid mechanics in the air pocket and the conduction in the polystyrene block and the radiator in order to determine the steady-state temperature T of the sample for each value of $P_{out}$. At the steady-state temperature, $P_{out}=P_{cond+conv}=Ah_c(T_{amb}-T)$. The result of this simulation is shown in FIG. 11B as the blue line, whose slope is the simulation's prediction of the non-radiative heat transfer coefficient $h_c$. By linear regression, a value of $h_c$=2.5 W $m^{-2}K^{-1}$ can be subsequently used with the theoretical model and fits the observed data very well.

Some embodiments implement a theoretical model to explain the water temperature curve. Before freezing occurs, because of the high heat conductivity of aluminum as 205 W/m K and small thermal mass of salt water as 30 g, it's reasonable to assume that there is no heat loss between the cold plate and the salt water, so the saltwater and cold plate can be considered as a whole. Then the radiative power $P_{rad}$ can be expressed as follows:

$$P_{net}\Delta t = (m_{Al}C_{Al} + m_s C_s)\Delta T \tag{7}$$

Here $m_{Al}$ and $m_s$ are the mass of the cold plate and saltwater and $C_{Al}$ and $C_s$ are the heat capacity of aluminum plate and saltwater. $P_{net}$ can be calculated from Equation (1) with the air transfer coefficient h, within the range of 2-4 W/$m^2$/K. The mass of cold plate and saltwater is 410 g and 30 g respectively. To fit the curve, he initial temperature of the radiative cooler is assumed to be the same as the ambient temperature measured during the experiment and we choose ΔT equals=0.01 K each time and calculate time step Δt to cool down for this small temperature drop according to Eq. (7). Then the corresponding experimental ambient temperature after each time step can be used as the input ambient temperature for the next ΔT drop to calculate the new time step Δt. By adding up these small time steps, the temperature drop corresponding to time as is shown in the FIGS. 6A-6D grey regions, which fits well with the experimental value.

At the onset of freezing, ice begins to form. This formation process can be expressed as follows:

$$P_{net}\Delta t - S\times H_f\,\Delta t = (m_{Al}\times C_{Al} + m_s\times C_s)\Delta T \quad (8)$$

The rate of mass transferred from liquid to solid depends upon the nucleation rate $S_n$, the mass of the single crystal $S_m$ according to the relationship.

$$S = S_n S_m \quad (9)$$

where $S_n$ is the nucleation rate given as $$S_n = \frac{RT_b}{h}\exp\left(\frac{A(T_f)^2}{T_b(T_f - T_b)^2}\right),\ T_b < T_f \quad (10)$$

Here $T_b$ is the bulk water temperature, $T_f$ is the freezing temperature of brine used, R is the ideal gas constant, h is Planck's constant and A is an empirical constant which may be calculated by assuming that $S_n$=1 at nucleation. Further assuming that the crystals are spherical, the mass of single crystal is obtained from $$S_m = 4\pi r_s \rho_s/3 \quad (11)$$

where $\rho_s$ is the density of ice, $r_s$ is the average diameter of the single ice crystal and we assume it equals half of the final crystal size, r=0.5 $D_p$.

The rate of change of the diameter $D_p$ of a single crystal relates with the difference between the temperature $T_i$ of the ice/liquid interface and temperature $T_b$ of the bulk liquid as $$\frac{dD_p}{dt} = \frac{G}{D_p}(T_i - T_b) \quad (12)$$

where G is the rate constant defined according to driving force ratio $E_x$ as $$G = 0.6129\times 10^{-8}E_x \quad (13)$$

and $E_x$ is dependent on salt concentration $W_l$ of the bulk liquid according to $$E_x = 1/\{1 + 77W_l/(1 - W_l)\} \quad (14)$$

The ice/liquid interface temperature $T_i$ is defined in terms of the liquid bulk temperature and the driving force ratio using $$T_i = (T_f - T_b)E_x + T_b \quad (15)$$

The temperature decrease for ΔT=0.01 K temperature steps and calculate the time Δt needed to cool down ΔT according to Equation (8). The rate of mass formation S can then be calculated from Equations (9-15). The corresponding experimental ambient temperature after each time step is used as the input ambient temperature for the next ΔT drop to calculate the new time step Δt. Using this approach, the temperature drop and thus the cooling curve can be modeled as shown in the grey regions of FIGS. 6A-6D, which map well to the experimentally measured values.

Example 5: Levelized Cost of Water Analysis

Levelized cost of water (LCW) analysis was performed based on the implementation of the radiative cooling freezing desalination system. The following general formula is applied to calculate the LCW of the proposed passive freezing desalination system:

$$LCW(\$/m^3) = \frac{C_0 + \sum_{t=1}^{25}\frac{OM_t + F_t}{(1+i_t)^t}}{\sum_{t=1}^{25}\frac{W_t}{(1+i_t)^t}}$$

$C_0$ represents the capital cost, $OM_t$ represents annual cost (including chemical and overhead), $F_t$ represents the decommissioning cost and $W_t$ is the water production. We assume that the project/product lifetime is 25 years, and the interest rate of financing ($i_t$) is assumed to be 3% and for simplicity we assume no decommissioning cost ($F_t$=0).

A capital cost is of about \$10.7/m$^2$. The annual operational cost is calculated at a value of \$0.821/m$^2$. This includes electricity costs of \$0.011/m$^2$/year, filter cost at \$0.81/m$^2$/year. Filter is made from 3D printer PLA filament. For the current obtained water production rate of ~3.3 L/day/m$^2$, the LOW cost is \$1.19/m$^3$, as is shown in Table 2, which is comparable with published LCW values for solar desalination which are \$0.8-1.5/m.

TABLE 2

Levelized cost of water input variables. Inputs for levelized cost of water (LCW) estimate for our radiative cooling freezing desalination system.

| | Capital cost ($C_0$) | | | Annual cost ($OM_t$) | |
|---|---|---|---|---|---|
| Interest rate($i_t$) | additive cooler | Low-density polyethylene | Metal plate with tube | Electricity | Filter |
| 3% | \$0.6/m$^2$ | \$0.1/m$^2$ | \$10/m$^2$ | \$0.011/m$^2$ | \$0.81/m$^2$ |

Figure 12A:
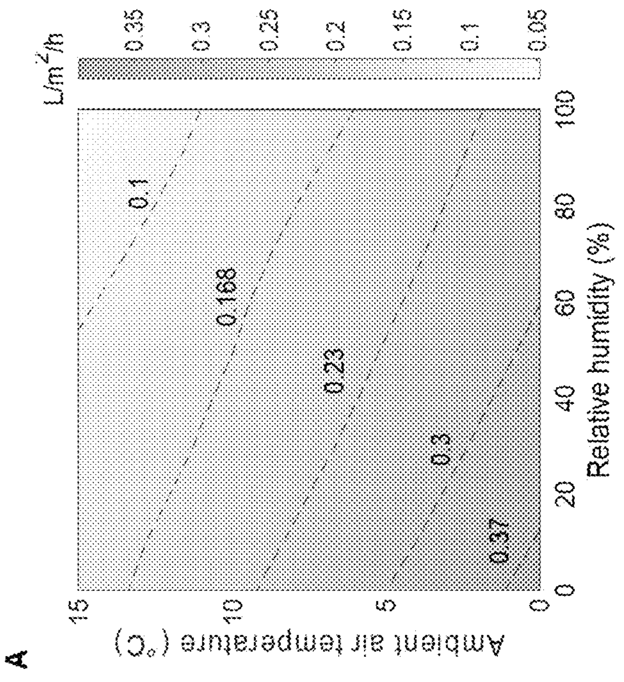
FIGS. 12A-12B illustrate freezing desalination performance in a vacuum system in accordance with an embodiment of the invention.
Figure 12B:
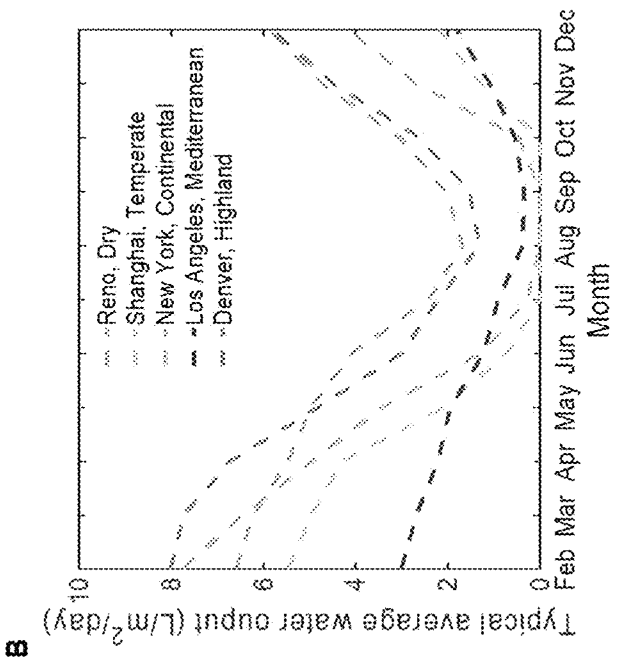

Example 6: Modeling Water Production Rates for a Vacuum System in Different Climate Zones The expected water production rate in different climate zones can be calculated assuming a system identical to the current implementation (cold plate, Scotch tape as the emitter, no supercooling), but instead assume non-radiative heat transfer coefficients $h_c$~0, similar to what one would obtain with a vacuum system. For sea water desalination with initial input salinity of 35 g/L, the performance of such a system at different ambient temperatures and relative humidity are shown in FIG. 12A. The predicted water production rate on a daily basis for five climate zones is shown in FIG. 12B. FIG. 12A shows predicted water production rate for radiative cooling freezing desalination in the scenario where the non-radiative heat transfer coefficient is maximally suppressed ($h_c$~0) for different relative humidity and ambient temperatures. FIG. 12B shows prediction of water production rate with this method for the cities of five different climate zones when the non-radiative heat transfer coefficient $h_c$~0.

Example 7: Multi-Layer Polyethylene for Infrared-Transparent Insulation

The multi-layer insulation may improve cooling performance in radiative cooling where there is a deep sub-ambient temperature regime. In this regime, the insulation benefits of two layers (a reduced non-radiative coefficient of heat exchange) can outweigh the transmission loss due to additional layers of low-density polyethylene (LDPE). Two layers of LDPE films will form an air pocket which will provide better thermal insulation compared with a single layer film. FIG. 13A illustrates experimentally measured transmittance of single and double-layer 12.5 μm-thick polyethylene films at zenith (0° angle of incidence) in accordance with an embodiment. As is shown in FIG. 13A, the infrared transmittance of LDPE film towards the zenith is about 92%, with two layers bringing it down to approximately 84%. The advantage of providing well thermal insulation outweighs the reduced infrared transmittance, resulting in higher cooling powers compared to a single layer of PE film.

Figure 13B:
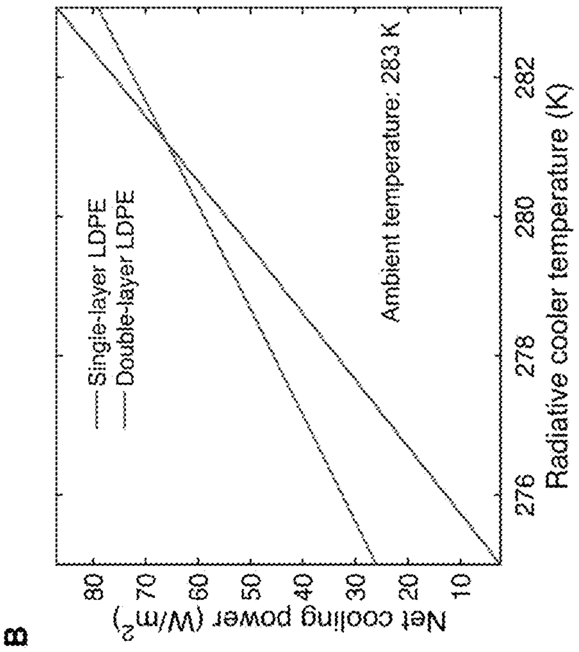
FIGS. 13A-13B illustrate properties of a single layer low density polyethylene cover and a double-layer low density polyethylene cover respectively in accordance with an embodiment of the invention.
Figure 13A:
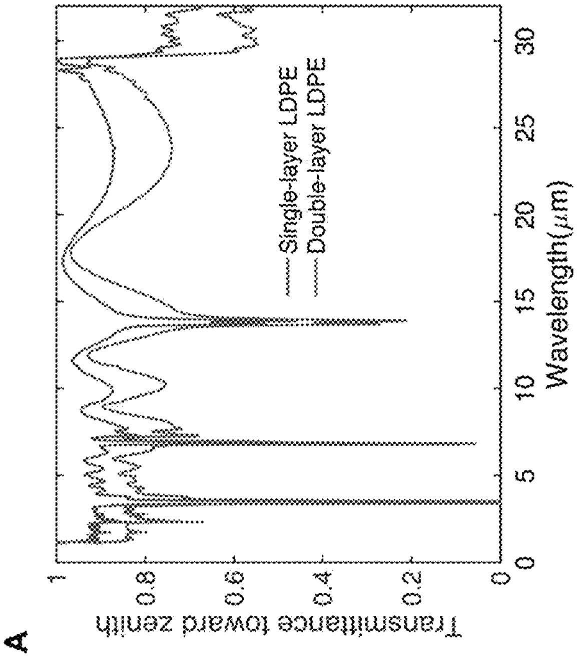

FIG. 13B illustrates net radiative cooling power vs. radiative cooling temperature for a selective radiative cooler beneath a single layer of LDPE and one under two layers of LDPE in accordance with an embodiment. The net cooling power vs. temperature for a selective radiative cooler beneath a single layer of LDPE and one under two layers of LDPE. At temperatures near the air temperature, a single layer of LDPE is superior as the loss in IR transmittance is more important than any gain in conductive or convective isolation. However, as one proceeds to lower sub-ambient temperatures, the benefit of the reduced coefficient of conductive and convective heat exchange results in net cooling power of the two-layer LDPE window outperforming that of the single-layer LDPE configuration. This begins within a few° C. below ambient and is even more important as one reaches lower temperatures.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the terms "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

What is claimed is:

1. A method for desalination comprising:

contacting a water source with a radiative cooling surface, wherein the radiative cooling surface faces outwardly to an atmosphere; wherein the radiative cooling surface comprises a thermal emitter with an emissivity from 0.5 to 1 at an electromagnetic wavelength range from 8 μm to 13 μm;

freezing the water source via radiative cooling to form ice and brine; wherein the radiative cooling transfers heat from the water source to the atmosphere via the radiative cooling surface; and obtaining desalinated water by thawing the ice, wherein the desalinated water has a salinity lower than the water source.

2. The method of claim 1, further comprising washing the ice with a low salinity water.

3. The method of claim 2, further comprising sweating the ice under a temperature gradient.

4. The method of claim 1, further comprising adding at least one ice seed to the water source before freezing.

5. The method of claim 1, further comprising separating the ice from the brine.

6. The method of claim 1, wherein the desalination is combined with a solar desalination process.

7. A desalination system comprising:

a water source;

a radiative cooling surface in contact with the water source; wherein the radiative cooling surface faces outwardly to an atmosphere, and is configured to transfer heat from the water source to the atmosphere and to freeze the water source;

wherein the radiative cooling surface comprises a thermal emitter with an emissivity from 0.5 to 1 at an electromagnetic wavelength range from 8 μm to 13 μm; and a collecting system configured to collect ice from the frozen water source, wherein the ice comprises desalinated water.

8. The system of claim 7, wherein the water source is selected from the group consisting of: brackish water, saline water, seawater, salt water, and any combinations thereof.

9. The system of claim 7, wherein the water source has a salinity greater than or equal to 35‰.

10. The system of claim 7, wherein the water source comprises at least one ice seed.

11. The system of claim 7, further comprising a separation system to separate ice and brine from the frozen water source.

12. The system of claim 11, wherein the separation system comprises a filter.

13. The system of claim 7, wherein the collecting system comprises a hydrophilic surface to improve ice collection efficiency.

14. The system of claim 7, wherein the thermal emitter comprises a material selected from the group consisting of: an acrylic polymer, indium tin oxide, aluminum oxide, hafnium oxide, and any combinations thereof.

15. The system of claim 7, wherein the radiative cooling surface is insulated with at least one material to minimize a thermal emittance.

16. The system of claim 15, wherein the at least one material is selected from the group consisting of: polyurethane, polyurethane foam, polystyrene, cellulose, mylar, low density polyethylene, high density polyethylene, polyester, polyisocyanurate, fiberglass, wool, reflective foil, natural fiber, and any combinations thereof.

17. The system of claim 16, wherein the at least one material comprises a double-layer low density polyethylene.

18. The system of claim 7, wherein the desalinated water has a salinity of less than 35‰.

19. The system of claim 7, wherein the desalinated water is used as the water source for the desalination system.

20. A hybrid desalination system comprising:

a desalination system comprising:

a water source;

a radiative cooling surface in contact with the water source; wherein the radiative cooling surface faces outwardly to an atmosphere, and is configured to transfer heat from the water source to the atmosphere and to freeze the water source; wherein the radiative cooling surface comprises a selective thermal emitter with an emissivity from 0.5 to 1 at an electromagnetic wavelength range from 8 μm to 13 μm, and an emissivity from 0.5 to 1 at an electromagnetic wavelength range from 0.3 μm to 2.5 μm; and a collecting system configured to collect ice from the frozen water source, wherein the ice comprises desalinated water; and a solar thermal desalination system;

wherein the solar thermal desalination system desalinates during daytime and the desalination system desalinates during nighttime.

* * * * *